(12) United States Patent
Aweya et al.

(10) Patent No.: US 8,675,686 B2
(45) Date of Patent: *Mar. 18, 2014

(54) TECHNIQUES FOR TIME TRANSFER VIA SIGNAL ENCODING

(75) Inventors: James Aweya, Kanata (CA); Michel Ouellette, Orleans (CA)

(73) Assignee: Rockstar Consortium US LP, Plano, TX (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/162,242

(22) Filed: Jun. 16, 2011

(65) Prior Publication Data

US 2011/0243156 A1 Oct. 6, 2011

Related U.S. Application Data

(63) Continuation of application No. 12/347,314, filed on Dec. 31, 2008, now Pat. No. 7,995,621.

(60) Provisional application No. 61/101,802, filed on Oct. 1, 2008.

(51) Int. Cl.
*H04J 3/06* (2006.01)

(52) U.S. Cl.
USPC ....................................... 370/503

(58) Field of Classification Search
USPC ................................. 370/503, 476
See application file for complete search history.

(56) References Cited

U.S. PATENT DOCUMENTS

| | | | | |
|---|---|---|---|---|
| 5,784,387 A * | 7/1998 | Widmer | | 714/752 |
| 6,625,241 B2 * | 9/2003 | Mejia | | 375/372 |
| 6,775,300 B2 * | 8/2004 | Kuo | | 370/503 |
| 6,873,630 B1 * | 3/2005 | Muller et al. | | 370/356 |
| 7,324,510 B2 * | 1/2008 | Howe | | 370/386 |
| 7,382,805 B1 * | 6/2008 | Raza et al. | | 370/528 |
| 7,697,555 B1 * | 4/2010 | Feng | | 370/412 |
| 7,738,450 B1 * | 6/2010 | Davis | | 370/363 |
| 7,809,021 B2 * | 10/2010 | McClellan | | 370/476 |
| 7,995,621 B2 | 8/2011 | Aweya et al. | | |
| 2006/0259627 A1 | 11/2006 | Kellerer et al. | | |
| 2007/0116055 A1 * | 5/2007 | Atsumi et al. | | 370/476 |

FOREIGN PATENT DOCUMENTS

EP 2345199 A1 7/2011

OTHER PUBLICATIONS

Final Office Action for U.S. Appl. No. 12/347,314 mailed Jan. 3, 2011, 10 pages.
International Search Report for PCT/CA2009/001378 mailed Jan. 13, 2010, 10 pages.

(Continued)

*Primary Examiner* — Ricky Ngo
*Assistant Examiner* — Ben H Liu
(74) *Attorney, Agent, or Firm* — Withrow & Terranova, PLLC

(57) ABSTRACT

Techniques for time transfer via signal encoding are disclosed. In one particular exemplary embodiment, the techniques may be realized as a method for time transfer via signal encoding comprising generating a time service ordered-set for inclusion in a physical coding sublayer frame of a physical layer device, generating time service data for inclusion in the physical coding sublayer frame of the physical layer device, and transmitting the physical coding sublayer frame.

24 Claims, 17 Drawing Sheets

(56) References Cited

OTHER PUBLICATIONS

Non-final Office Action for U.S. Appl. No. 12/347,314 mailed Aug. 4, 2010, 7 pages.

Notice of Allowance for U.S. Appl. No. 12/347,314 mailed Mar. 21, 2011, 8 pages.

First Chinese Office Action for China Patent Application No. 200980146216.6, mailed Jun. 5, 2013, 6 pages.

Japanese Office Action for Patent Application No. 2011-529426, mailed Aug. 16, 2013, 7 pages.

* cited by examiner

| Code-Group Name | 8B Bits HGF EDCBA | Byte Value (Hex) | Current RD(-) abcdei fghj | Current RD(+) abcdei fghj |
|---|---|---|---|---|
| D0.0 | 000 00000 | 00 | 100111 0100 | 011000 1011 |
| D3.1 b | 001 00011 | 23 | 110001 1001 | 110001 1001 |
| D2.2 a | 010 00010 | 42 | 101101 0101 | 010010 0101 |
| D16.2 | 010 10000 | 50 | 011011 0101 | 100100 0101 |
| D23.2 | 010 10111 | 57 | 111010 0101 | 000101 0101 |
| D10.3 | 011 01010 | 6A | 010101 1100 | 010101 0011 |
| D0.4 | 100 00000 | 80 | 100111 0010 | 011000 1101 |
| D21.5 b | 101 10101 | B5 | 101010 1010 | 101010 1010 |
| D5.6 b | 110 00101 | C5 | 101001 0110 | 101001 0110 |
| D15.7 | 111 01111 | EF | 010111 0001 | 101000 1110 |
| K28.5 c | 101 11100 | BC | 001111 1010 | 110000 0101 |

Note:
a. Example code-groups containing non-neutral disparity subblocks which change the current running disparity (RD)
b. Example code-groups with identical RD(+) and RD(-) encodings and neutral disparity subblocks
c. /K28.5/ is the only code-group containing a comma used for Gigabit Ethernet

Figure 8

| Code | Ordered-Set | Number of Code-Groups | Encodings |
|---|---|---|---|
| /C/ | Configuration | | Alternating /C1/ and /C2/ Code-Groups |
| /C1/ | Configuration 1 | 4 | /K28.5/D21.5/Config_Reg[a] |
| /C2/ | Configuration 2 | 4 | /K28.5/D2.2/Config_Reg[a] |
| /I/ | IDLE | | /I1/ is Correcting; /I2/ is Preserving |
| /I1/ | IDLE 1 | 2 | /K28.5/D5.6/ |
| /I2/ | IDLE 2 | 2 | /K28.5/D16.2/ |
| | Encapsulation | | |
| /R/ | Carrier_Extend | 1 | /K23.7/ |
| /S/ | Start_of_Packet | 1 | /K27.7/ |
| /T/ | End_of_Packet | 1 | /K29.7/ |
| /V/ | Error_Propagation | 1 | /K30.7/ |

Note:
[a] Two data code-groups represent the Config_Reg value

Figure 10

| Ordered-Set | xx | /I/ | | /S/ | xx |
|---|---|---|---|---|---|
| Code-Group | xx | /K28.5/ | /D16.2/ | /K27.7/ | xx |
| Alignment | xx | EVEN | ODD | EVEN | xx |

Figure 12

| Ordered-Set | /T/ | /R/ | /I/ | |
|---|---|---|---|---|
| Code-Group | xx | /K29.7/ | /K23.7/ | /K28.5/ | /D5.6/ or /D16.2/ |
| Alignment | xx | EVEN | ODD | EVEN | ODD |

Figure 13

| Ordered-Set | xx | /T/ | /R/ | /R/ | /I/ | |
|---|---|---|---|---|---|---|
| Code-Group | xx | /K29.7/ | /K23.7/ | /K23.7/ | /K28.5/ | /D5.6/ or /D16.2/ |
| Alignment | xx | ODD | EVEN | ODD | EVEN | ODD |

Figure 14

TECHNIQUES FOR TIME TRANSFER VIA SIGNAL ENCODING

CROSS-REFERENCE TO RELATED APPLICATIONS

This patent application is a continuation of U.S. patent application Ser. No. 12/347,314, filed Dec. 31, 2008, which claims priority to U.S. Provisional Patent Application No. 61/101,802, filed Oct. 1, 2008, each of which is hereby incorporated by reference herein in its entirety.

FIELD OF THE DISCLOSURE

The present disclosure relates generally to telecommunications systems and, more particularly, to techniques for time transfer via signal encoding.

BACKGROUND OF THE DISCLOSURE

Time and/or frequency distribution is a fundamental requirement for packet networks. One of the biggest hurdles packet networking technologies face in replacing traditional Time Division Multiplexing (TDM) systems in both core and access networks is the transmission of accurate timing information (time and/or frequency). Legacy TDM networks were designed to carry precise frequency synchronization throughout their respective networks. But increasingly, access systems such as wireless base stations and multi-service access nodes (MSANs) require synchronization delivered over a network backhaul connection for basic connectivity and assurance of high quality of service to end user applications. A key dependency in the evolution to Ethernet backhaul in telecommunication networks is an ability to deliver carrier-grade (time and/or frequency) synchronization over Ethernet to remote wireless base stations and access platforms.

In telecommunication networks, remote and access TDM network elements with their embedded reference oscillators have traditionally recovered synchronization from TDM backhaul connections. As long as the TDM transmission network was traceable to a Primary Reference Clock (PRC), the remote and access elements could employ relatively simple Phase-Locked Loops (PLLs) to lock their oscillators to a PRC traceable backhaul feed. However, a problem occurs when a backhaul connection transitions to Ethernet, thus isolating the remote and access elements from their source of synchronization. While Ethernet has proven to be a useful, inexpensive, and ubiquitous technology for connectivity, it has not been well suited for applications requiring precise synchronization. By nature, it is asynchronous, which creates difficulty for real-time or timing sensitive applications that require synchronization.

Two principal sources of timing errors must be eliminated to provide high quality (sub-microsecond level) synchronization of clocks. The first is timing errors introduced by instabilities and drift of local oscillators, and the second is fluctuations in path delay (commonly know as delay variation) between transmitter and receiver clocks. Oscillator stability is primarily a component selection issue for a system designer. Employing a high-stability oscillator reduces measurement noise and improves the ability of a receiver clock synchronization mechanism to filter out transmission wander and jitter caused by network impairments. The primary sources of delay variations are due to Layer 2 and higher impairments such as queuing delays in network devices, media contention delays, software protocol stack processing delays, operating system and other software tasks delays, etc. Delay variation significantly degrades clock synchronization because it introduces variability to the travel time of timing protocol messages. At Layer 2 and higher, regardless of whether a network is lightly or heavily loaded, messages are short or long, or whether network equipment uses priority queuing or not, the potential for protocol messages to experience delay variations still exists. Timestamp filtering and minimum delay screening and selection of messages at end nodes, in addition to the use of robust clock synchronization algorithms, can help mitigate this problem to some extent, but this depends on traffic load level along a message communication path.

The rationale for minimum delay screening and selection of messages at end nodes is that delay variation on a communication path at Layer 2 and higher (Layer 2+) will have a probability distribution function with a "floor" or intrinsic minimum. The floor is a minimum delay that a packet (or a timing protocol message) can experience in a given network path. This floor may be viewed as a condition where all queues along the network path between a transmitter and a receiver are near their minimum when the particular packet is transmitted. Under normal non-congested loading conditions on the network path, a fraction of the total number of packets will traverse the network at or near this floor, even though some may experience significantly longer delays. Under these non-congestion conditions, store-and-forward operations in high-speed devices effectively become forwarding efforts with packets forwarded with minimum delay. In addition, the delay variation distribution becomes more concentrated near this floor, with a relatively large fraction of the total packets experiencing this "minimum" or "near minimum" delay. However, a major limitation of this approach is that, at higher loads, minimum delay screening and selection of messages at end nodes will simply produce poor clock quality since a very small fraction of timing messages will experience the minimum "intrinsic" propagation delay of the network path.

In view of the foregoing, it may be understood that there may be significant problems and shortcomings associated with current clock synchronization technologies.

SUMMARY OF THE DISCLOSURE

Techniques for time transfer via signal encoding are disclosed. In one particular exemplary embodiment, the techniques may be realized as a method for time transfer via signal encoding comprising generating a time service ordered-set for inclusion in a physical coding sublayer frame of a physical layer device, generating time service data for inclusion in the physical coding sublayer frame of the physical layer device, and transmitting the physical coding sublayer frame.

In accordance with other aspects of this particular exemplary embodiment, the method may further comprise generating a transmit timestamp for inclusion in the time service data.

In accordance with further aspects of this particular exemplary embodiment, the time service ordered-set may be a single special code-group selected from unused special code-groups.

In accordance with additional aspects of this particular exemplary embodiment, the time service ordered-set may be a sequence of code-groups comprising an initial special code-group selected from unused special code-groups followed by at least one additional special code-groups selected from the unused special code-groups.

In accordance with still other aspects of this particular exemplary embodiment, the time service ordered-set may be a sequence of code-groups comprising an initial special code-group selected from unused special code-groups followed by at least one additional data code-groups.

In accordance with still further aspects of this particular exemplary embodiment, the at least one additional data code-groups may have one or more of: high bit transition density, disparity control, and coding distance.

In accordance with still additional aspects of this particular exemplary embodiment, the time service ordered-set may indicate a type of the time service data.

In accordance with yet other aspects of this particular exemplary embodiment, the method may further comprise receiving the physical coding sublayer frame and extracting the time service data from the received physical coding sublayer frame.

In accordance with yet further aspects of this particular exemplary embodiment, the method may further comprise generating a receive timestamp to determine a receipt time of the time service data.

In another particular exemplary embodiment, the techniques may be realized as at least one processor readable medium for storing a computer program of instructions configured to be readable by at least one processor for instructing the at least one processor to execute a computer process for performing the above-described method.

In still another particular exemplary embodiment, the techniques may be realized as an apparatus for time transfer via signal encoding comprising an encoder component to generate a time service ordered-set for inclusion in a physical coding sublayer frame of a physical layer device, a time transfer unit to generate time service data for inclusion in the physical coding sublayer frame of the physical layer device, and a transmitter to transmit the physical coding sublayer frame.

In still another particular exemplary embodiment, the techniques may be realized as an apparatus for time transfer via signal encoding comprising means for generating a time service ordered-set for inclusion in a physical coding sublayer frame of a physical layer device, means for generating time service data for inclusion in the physical coding sublayer frame of the physical layer device, and means for transmitting the physical coding sublayer frame.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 8 shows example Data (D) and Special (K) Codes for Gigabit Ethernet in accordance with an embodiment of the present disclosure.

FIG. 10 shows defined ordered-sets for Gigabit Ethernet in accordance with an embodiment of the present disclosure.

FIG. 12 shows a table indicating when a Start_of_Packet Delimiter (SPD) ordered-set (/S/) may be transmitted in accordance with an embodiment of the present disclosure.

FIG. 13 shows a table indicating when an End_of_Packet Delimiter (EPD) may be transmitted with /T/R/K28.5/ code-groups in accordance with an embodiment of the present disclosure.

FIG. 14 shows a table indicating when an End_of_Packet Delimiter (EPD) may be transmitted with /T/R/R/ code-groups in accordance with an embodiment of the present disclosure.

DETAILED DESCRIPTION OF EXEMPLARY EMBODIMENTS

The present disclosure relates to enhancements to a Physical Layer of Gigabit Ethernet that enable accurate distribution of time and frequency. In accordance with the present disclosure, network slave devices may synchronize to a master reference time source (or server) using a messaging protocol. The messaging protocol may be a ranging technique by which the slave devices (or clients) may estimate their time offsets from the master time reference. The slave devices may accomplish this by exchanging a series of timestamped messages at the Physical Layer with a central time server.

A Physical Coding Sublayer (PCS) of the Physical Layer of Gigabit Ethernet may map Gigabit Medium-Independent Interface (GMII) signals into 10-bit code-groups, and vice-versa, using an 8B/10B block coding scheme. The PCS may accept packets from a Reconciliation sublayer via the GMII and encode a packet before passing it to a Physical Medium Attachment (PMA) sublayer. The PCS may also decode a bit stream received from the PMA sublayer and pass it to a Medium Access Control (MAC) sublayer via the GMII and the Reconciliation sublayer.

Some special code-groups of the 8B/10B block coding scheme may comprise distinct and easily recognizable bit patterns, which may allow a receiver to extract time service data (TSD) embedded directly in a PCS frame sent by a time server (master). Control and management information in Gigabit Ethernet, as opposed to data, may be communicated through the transmission of ordered-sets. Ordered-sets may be flexible building blocks which may be used for in-band or out-of-band protocol functions. Ordered-sets may be one, two, or four code-groups in length, and may begin with a code from the Gigabit Ethernet special code-groups. An ordered-set may be either a single special code-group or sequence of code-groups comprising an initial special code-group followed by additional special or data code-groups. The Gigabit Ethernet standard defines twelve special code-groups out of which only six may be used in normal operation in the form of ordered-sets. The remaining unused special code-groups may be used to define time service ordered-sets (TSOSs) which may be used to mark the presence of TSD in a PCS frame. The TSD may comprise timing messages exchanged between a transmitter and a receiver that may allow the receiver to synchronize its time-of-day (wall-clock) and/or frequency to that of the transmitter. Embedding TSD in such a manner may provide extremely accurate time measurements since such is based on actual transmission and reception times of timing messages measured directly at the Physical Layer.

Figure 1:
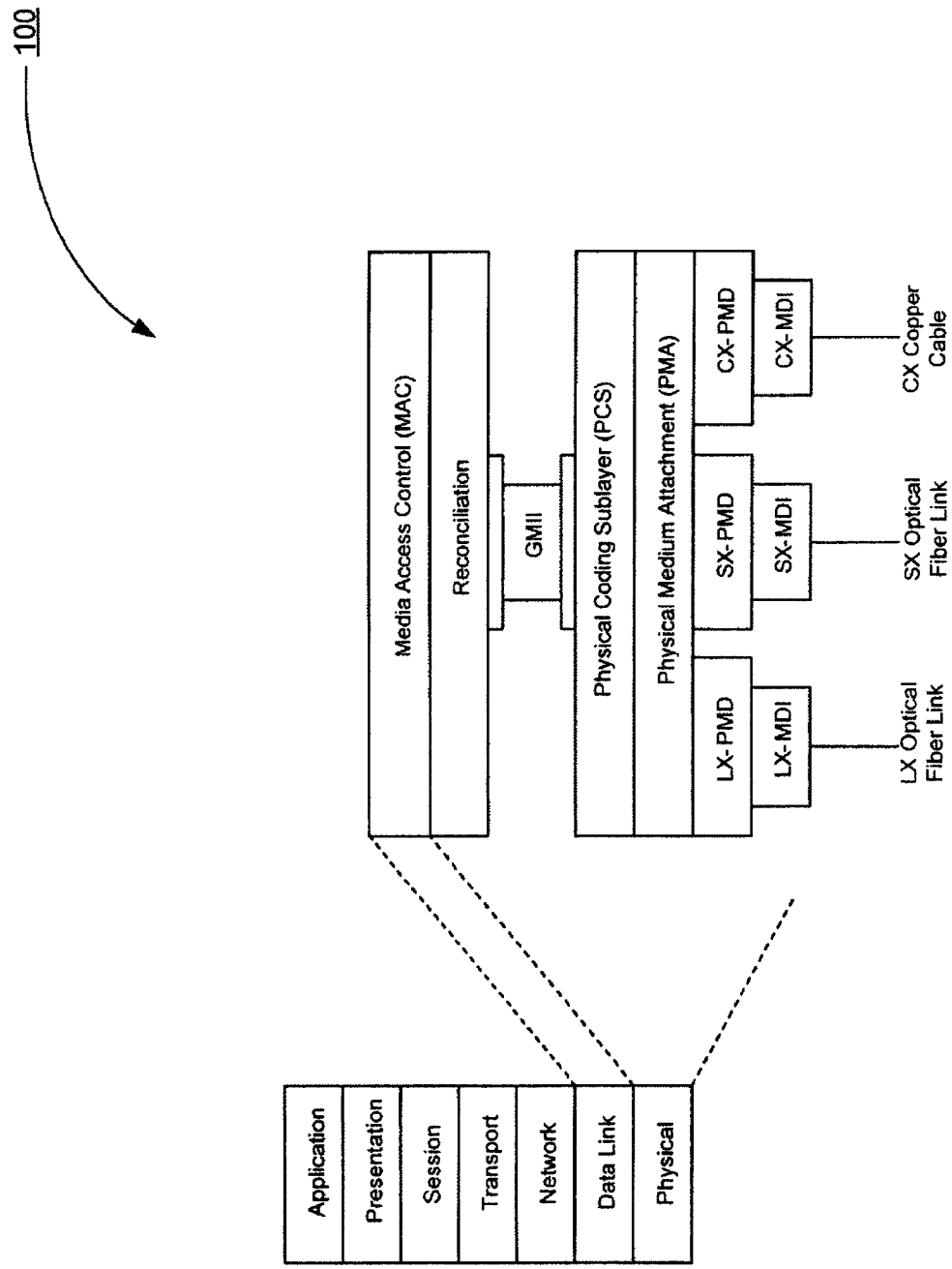
FIG. 1 shows a layered model for Gigabit Ethernet in relation to an Open Systems Interconnection (OSI) 7-layer model in accordance with an embodiment of the present disclosure.

Referring to FIG. 1, there is shown a layered model 100 for Gigabit Ethernet in relation to an Open Systems Interconnection (OSI) 7-layer model in accordance with an embodiment of the present disclosure. As shown, Gigabit Ethernet is primarily realized on a Data Link Layer and a Physical Layer of the OSI 7-layer model. The Physical Layer provides a means to transform data bytes provided by the Data Link Layer into appropriate signals for transmission on media. Likewise, the Physical Layer converts signals received from media into appropriate data bytes before passing them on to the Data Link Layer.

The Physical Layer may comprise several sublayers, including a Medium Dependent Interface (MDI) sublayer, a Physical Medium Dependent (PMD) sublayer, a Physical Medium Attachment (PMA) sublayer, a Physical Coding Subsystem (PCS) sublayer, a Gigabit Medium Independent Interface (GMII) sublayer, and a Reconciliation sublayer.

The MDI sublayer defines a connector between the PMD sublayer and media. The media may comprise, for example, a long wavelength (LX) optical fiber link, a short wavelength (SX) optical fiber link, and/or a copper cable (CX).

The PMD sublayer is responsible for transmitting and receiving individual bits to/from the media. The PMD sublayer takes a serial bit stream provided by the PMA sublayer and converts it to/from optical or electrical signals depending upon the media (fiber or copper). The PMD sublayer responsibilities include bit timing, line signal encoding (Non-Return-to-Zero NRZ), and interacting with the media (fiber or copper).

The PMA sublayer provides the PCS sublayer with a media-independent interface for connecting to a variety of serial media. Specifically, the PMA sublayer performs symbol serialization and deserialization (SERDES). More specifically, the PMA sublayer serializes an encoded stream of 10-bit symbols before transmission, and deserializes an encoded stream 10-bit symbols after reception. The PMA sublayer is also responsible for aligning an incoming serial bit stream prior to passing 10-bit symbols to the PCS sublayer.

The PCS sublayer performs data symbol encoding and decoding, synchronization, and rate matching services for the Data Link Layer, which are usually independent of the physical medium used. More specifically, the PCS sublayer is responsible for encoding each byte passed down from the GMII sublayer into 10-bit code-groups. The PCS sublayer is also responsible for decoding 10-bit code-groups passed up from the PMA sublayer into bytes for use by the upper layers. The PCS sublayer also provides carrier detect signals and collision detect signals, and includes a mechanism for automatic link configuration called Auto-Negotiation. Auto-Negotiation is an Ethernet procedure by which two connected devices choose common transmission parameters, such as flow control and duplex mode. In this process, the two connected devices first share their capabilities for these parameters, and then choose the best possible mode of operation that are shared by the two connected devices.

The GMII sublayer is an interface between the Data Link Layer and the PCS sublayer. The PCS sublayer and the GMII sublayer communicate with one another via 8-bit parallel data lines and several control lines. The GMII sublayer typically provides an easy-to-implement, fully defined interface that allows a clean separation between the Data Link Layer and Physical Layer sublayers, and between the Physical Layer sublayers and a network management entity. The interface defines speeds up to 1000 Mbit/s, implemented using an eight bit data interface clocked at 125 MHz, and is backwards compatible with a Media Independent Interface (MII) specification. It can also operate on fall-back speeds of 10/100 Mbit/s as per the MII specification. Logically, the PCS sublayer and the PMA sublayer combine to take byte-wide GMII data and convert it into an encoded, serial bit stream (and vice versa).

The Reconciliation sublayer provides a mapping between Physical Layer Signaling (PLS) primitives and logical signals in the GMII sublayer. This is typically an architectural abstraction only, with no particular or required physical or software implementation in a real product. In practice, the Reconciliation sublayer typically provides no actual function and may be implemented as an integral function of the Data Link Layer.

The Data Link Layer of Gigabit Ethernet may comprise several sublayers, including a Medium Access Control (MAC) sublayer. The MAC sublayer may provide addressing and channel access control mechanisms that make it possible for several terminals or network nodes to communicate within a multipoint network, typically a local area network (LAN) or metropolitan area network (MAN). The MAC sublayer may act as an interface between a Logical Link Control (LLC) sublayer of the Data Link Layer and the Physical Layer.

Figure 2:
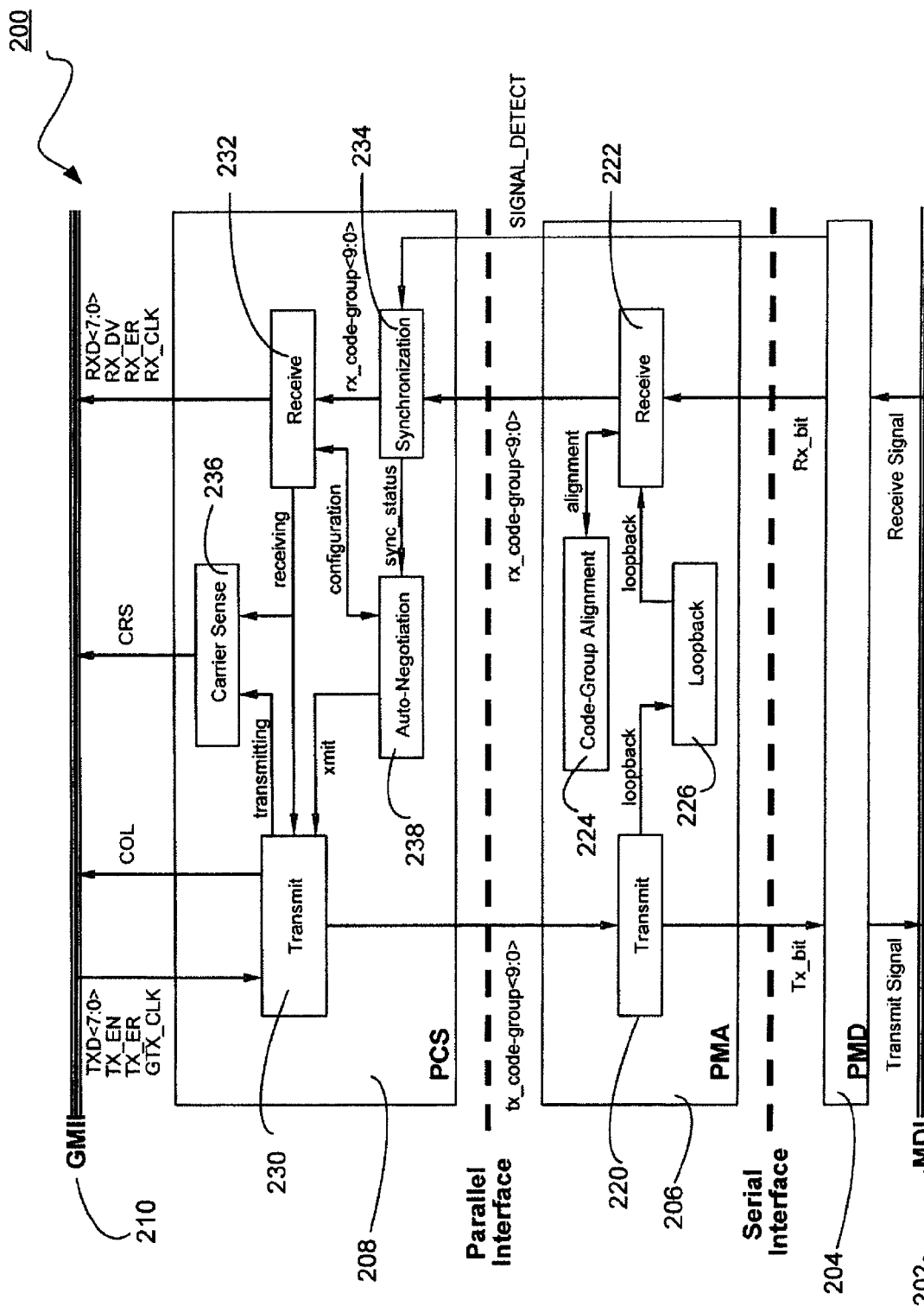
FIG. 2 shows a functional block diagram of the primary sublayers of the Physical Layer for Gigabit Ethernet in accordance with an embodiment of the present disclosure.

Referring to FIG. 2, there is shown a functional block diagram 200 of the primary sublayers of the Physical Layer for Gigabit Ethernet in accordance with an embodiment of the present disclosure. More specifically, FIG. 2 shows an MDI sublayer 202, a PMD sublayer 204, a PMA sublayer 206, a PCS sublayer 208, and a GMII sublayer 210.

The MDI sublayer 202 receives a serial transmit signal (Transmit Signal) from the PMD sublayer 204 and transmits a serial receive signal (Receive Signal) to the PMD sublayer 204.

The PMD sublayer 204 receives a serial transmit signal (Tx_bit) from the PMA sublayer 206 and transmits the serial transmit signal (Transmit Signal) to the MDI sublayer 202. The PMD sublayer 204 also receives the serial receive signal (Receive Signal) from the MDI sublayer 202 and transmits a serial receive signal (Rx_bit) to the PMA sublayer 206. The PMD sublayer 204 further transmits a signal level detection signal (SIGNAL_DETECT) indicative of the signal level of the serial receive signal (Receive Signal).

The PMA sublayer 206 comprises a transmit component 220, a receive component 222, a code-group alignment component 224, and a loopback component 226.

The transmit component 220 receives a 10-bit parallel encoded signal (tx_code-group<9:0>) from the PCS sublayer 208 and transmits the serial transmit signal (Tx_bit) to the PMD sublayer 204. The transmit component 220 converts the 10-bit parallel encoded signal (tx_code-group<9:0>) that is received from the PCS sublayer 208 into the serial transmit signal (Tx_bit) that is transmitted to the PMD sublayer 204.

The receive component 222 receives the serial receive signal (Rx_bit) from the PMD sublayer 204 and transmits a 10-bit parallel encoded signal (rx_code-group<9:0>) to the PCS sublayer 208. The receive component 222 coverts the serial receive signal (Rx_bit) that is received from the PMD sublayer 204 into the 10-bit parallel encoded signal (rx_code-group<9:0>) that is transmitted to the PCS sublayer 208. The receive component 222 also receives and transmits alignment control signals (alignment) from/to the code-group alignment component 224 so as to insure proper alignment of the 10-bit parallel encoded signal (rx_code-group<9:0>).

The code-group alignment component 224 receives and transmits alignment control signals (alignment) from/to the receive component 222 so as to insure proper alignment of the 10-bit parallel encoded signal (rx_code-group<9:0>).

The loopback component 226 operates to disable the transmission of the serial transmit signal (Tx_bit) from the transmit component 220 to the PMD sublayer 204 and provide a loopback path for the serial transmit signal (Tx_bit) from the transmit component 220 to the receive component 222. This function allows for self-testing of the Physical Layer.

The PCS sublayer 208 comprises a transmit component 230, a receive component 232, a synchronization component 234, a carrier sense component 236, and an auto-negotiation component 238.

The transmit component 230 receives an 8-bit parallel transmit data signal (TXD<7:0>), a transmit enable signal (TX_EN), a transmit error signal (TX_ER), and a GMII transmit clock signal (GTX_CLK) from the GMII sublayer 210. The transmit component 230 also receives a receiving indicator signal (receiving) from the receive component 232 and a transmit flag signal (xmit) from the auto-negotiation component 238 so as to insure proper configuration of the Physical Layer, as will be described in more detail below. The transmit component 230 transmits the 10-bit parallel encoded signal (tx_code-group<9:0>) to the PMA sublayer 206 and a transmitting indicator signal (transmitting) to the carrier sense component 236. Thus, the transmit component 230 encodes the 8-bit parallel transmit data signal (TXD<7:0>) that is received from the GMII sublayer 210 into the 10-bit parallel encoded signal (tx_code-group<9:0>) that is transmitted to the PMA sublayer 206.

The receive component 232 receives the 10-bit parallel encoded signal (rx_code-group<9:0>) from the synchronization component 234. The receive component 232 also receives and transmits configuration control signals (configuration) from/to the auto-negotiation component 238 so as to insure proper configuration of the Physical Layer, as will be described in more detail below. The receive component 232 transmits an 8-bit parallel receive data signal (RXD<7:0>), a receive data valid signal (RX_DV), a receive error signal (RX_ER), and a receive clock signal (RX_CLK) to the GMII sublayer 210. The receive component 232 transmits also transmits the receiving indicator signal (receiving) to the transmit component 230 and the carrier sense component 236. Thus, the receive component 232 decodes the 10-bit parallel encoded signal (rx_code-group<9:0>) that is received from the synchronization component 234 into the 8-bit parallel receive data signal (RXD<7:0>) that is transmitted to the GMII sublayer 210.

Gigabit Ethernet employs a block coding scheme, whereby a group of data bits are encoded into a larger space of code bits. When dealing with block codes it is common to refer to "data space" (i.e., unencoded bits) and "code space" (i.e., coded bits). Also, a grouping of code bits may be called a code-word, code-group, or symbol.

In the case of an 8-bit/10-bit (8B/10B) coding scheme, which is the coding scheme employed for Gigabit Ethernet, there is data space of $2^8$=256 8-bit words and code space of $2^{10}$=1024 10-bit words. Such a coding scheme provides a number of important characteristics for Gigabit Ethernet. First, 8B/10B coding scheme insures sufficient signal transitions for clock recovery at a receiver. Second, the 8B/10B coding scheme allows control signals to be encoded in a data stream. Third, the 8B/10B coding scheme allow specific code mappings that significantly increase the likelihood of detecting single- and multiple-bit errors through code violations. Fourth, the 8B/10B coding scheme allows some encodings (used for control signals) to contain a unique, easily recognizable code-bit pattern, known as a comma, which is a special sequence of seven bits that aids in rapid synchronization and receiver alignment.

The code space for the 8B/10B coding scheme is divided into two groups of codes: a "D" group to be used to encode data bytes and a "K" group to be used to encode special control characters. One possible implementation for the 8B/10B coding scheme is to encode data bytes into 8B/10B code-groups during frame transmission and to decode 8B/10B code-groups back into data bytes during frame reception. Another possible implementation for the 8B/10B coding scheme is to split data bytes into 3 bits (3B) and 5 bits (5B) that are then encoded/decoded, in a coordinated manner, so as to result in 8B/10B encodings/decodings.

Figure 3:
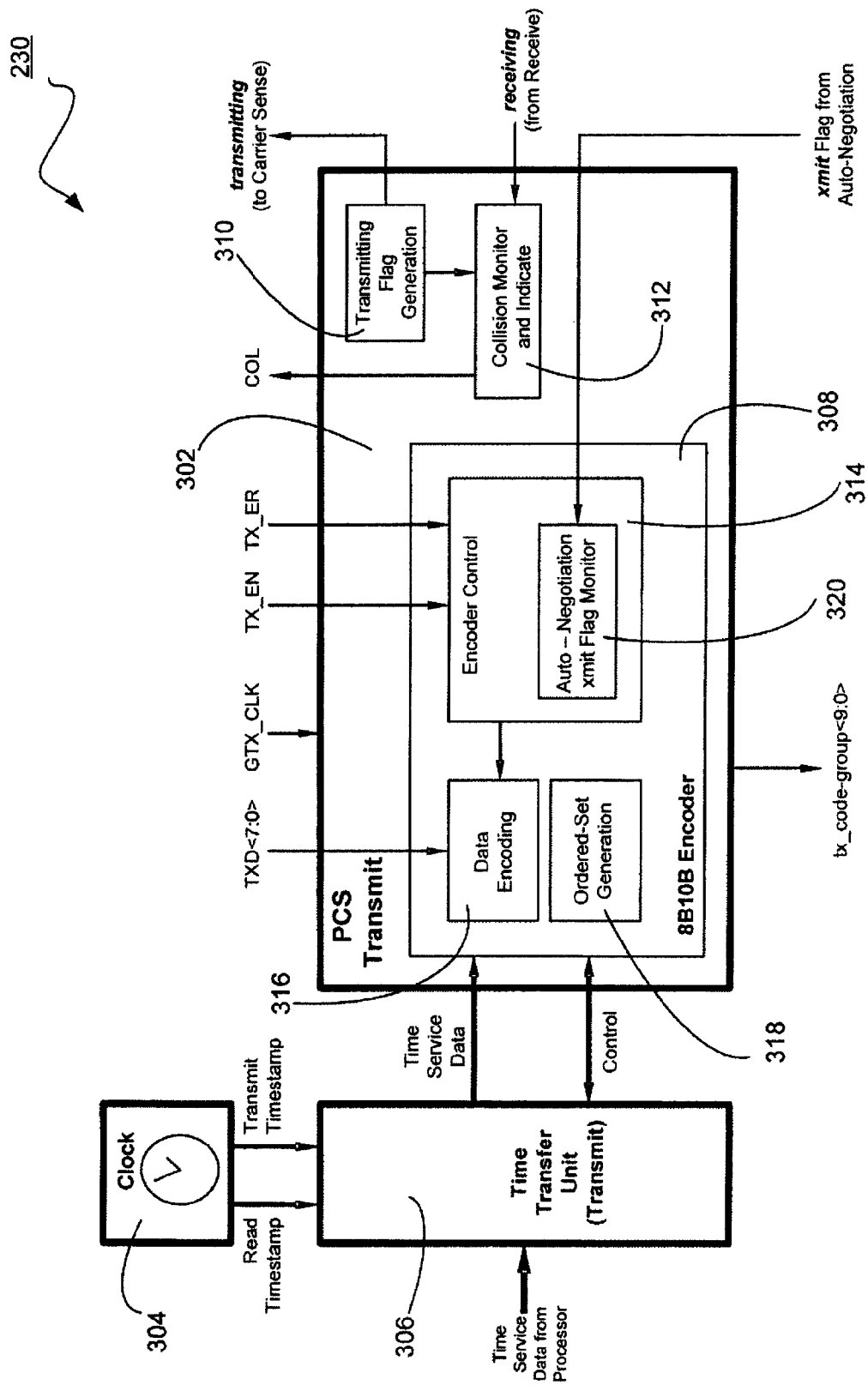
FIG. 3 shows a functional block diagram of a transmit component in a PCS sublayer in accordance with an embodiment of the present disclosure.

Referring to FIG. 3, there is shown a functional block diagram of the transmit component 230 in the PCS sublayer 208 in accordance with an embodiment of the present disclosure. The transmit component 230 may comprise a PCS transmit component 302, a transmit clock component 304, and a transmit time transfer unit 306. The PCS transmit component 302 may comprise an 8B10B encoder component 308, a transmitting flag generation component 310, and a collision monitor and indicator component 312. The 8B10B encoder 308 may comprise an encoder control component 314, a data encoding component 316, and an ordered-set generation component 318. The encoder control component 314 may comprise an auto-negotiation xmit flag monitor component 320.

The 8B10B encoder component 308 may encode the 8-bit parallel transmit data signal (TXD<7:0>) that is received from the GMII sublayer 210 into the 10-bit parallel encoded signal (tx_code-group<9:0>) that is transmitted to the PMA sublayer 206. The 8B10B encoder component 308 may also generate other predefined special non-data code-groups, known as special code-groups. Sets of these special code-groups, sometimes combined with data code-groups, may be used to construct control signals (such as packet delimiters) or exchange non-packet data for link configuration. These sets of special code-groups are known as ordered-sets. The 8B10B encoder component 308 and its associated components may generate these ordered-sets when required or as appropriate.

The additional bits provided by the expanded code space of the 8B/10B coding scheme add transmission overhead, but because there are more 10-bit code-groups than 8-bit data words, they provide a degree of transmission redundancy. This redundancy may be used to separate code-groups for data and control, to provide sufficient transition density for clock recovery, to allow simple code-group synchronization (alignment), to make error detection more efficient, and to combat poor transmission channel characteristics.

Packet data for transmission may be presented by GMII sublayer 210 using the byte-wide TXD<7:0> path and framed by the TX_EN and TX_ER signals. The 8B10B encoder component 308 may continuously generate 10-bit code-groups and pass them to the PMA sublayer 206. An exemplary embodiment of the 8B/10B coding scheme is described is greater detail below.

The encoder control component 314 may monitor the transmit flag signal (xmit) from the auto-negotiation component 238 (e.g., via the auto-negotiation xmit flag monitor component 320) and both the TX_EN signal and the TX_ER signal from the GMII sublayer 210. Based upon these signals, the encoder control component 314 may instruct the data encoding component 316 to pass the following code-groups or ordered-sets to the PMA sublayer 206. The code-groups passed to the PMA sublayer 206 may provide one of several indications.

First, when no packet data is presented by the GMII sublayer 210 (i.e., the TX_EN signal and the TX_ER signal are inactive), such as between frames, an Idle (/I/) code-group indication may be issued. The transmission of Idle ordered-sets may keep receive electronics and optics "alive" between packets. The Idle ordered-sets may be used as "keepalive" signals for both clock recovery electronics and electro-optics of a link. If no light is transmitted during inter-packet gaps (IPGs), sometimes referred to as the inter-frame gaps (IFG), an optical transmitter might not perform properly. Also, if no light is transmitted between packets, the signal level detection signal (SIGNAL_DETECT) may indicate a link failure, thereby triggering the synchronization component 234 and the auto-negotiation component 238.

Second, when the GMII sublayer 210 indicates a start-of-frame condition (i.e., when the TX_EN signal is freshly asserted or active and the TX_ER signal is inactive), the 8B10B encoder component 308 may generate a Start_of_Packet Delimiter (SPD) (/S/) code-group.

Third, when the GMII sublayer 210 indicates an end-of-packet condition (i.e., deassertion of the TX_EN signal), the 8B10B encoder component 308 may generate an End_of_Packet (/T/) code-group.

Fourth, packet data presented on the TXD<7:0> signal by the GMII sublayer 210 (i.e., when the TX_EN signal is active and the TX_ER signal is inactive) may be encoded directly by the 8B10B encoder component 308 into data (/D/) code-groups (i.e., tx_code-group<9:0>) and passed to the PMA sublayer 206, with the exception that a first byte of a preamble may be replaced with the SPD code-group. A data code-group, when not used to distinguish or convey information for a defined ordered-set, may convey one byte of arbitrary data between the GMII sublayer 210 and the 8B10B encoder component 308. The sequence of data code-groups may be arbitrary, where any data code-group may be followed by any other data code-group. Data code-groups may be coded and decoded but not interpreted by the 8B10B encoder component 308. Successful decoding of a data code-group depends on proper receipt of a Start_of_Packet delimiter (SPD) (/S/) code-group.

Fifth, when the GMII sublayer 210 provides a carrier-extend indication (i.e., when the TX_EN signal is inactive, the TX_ER signal is active, and the TXD<7:0> signal=OFF), the 8B10B encoder component 308 may generate a Carrier_Extend (/R/) code-group for each GTX_CLK period that the indication remains. A two code-group delay may be allowed to give the 8B10B encoder component 308 time to complete an End_of_Packet (/T/) code-group. In a half-duplex mode, Carrier_Extend (/R/) code-group may be used both to extend minimum size packets and to ensure carrier continuation during frame bursting.

Sixth, when the GMII sublayer 210 indicates a transmit-error condition (i.e., when the TX_EN signal is active and the TX_ER signal is active), the 8B10B encoder component 308 may generate an Error_Propagation (/V/) code-group for one or more GTX_CLK periods during a frame transmission. The Error_Propagation (/V/) code-group may be used by repeaters operating in a half-duplex mode to signal all of its ports that an error has been detected.

Lastly, the 8B10B encoder component 308 may encode a 16-bit configuration register or next-page transmit register provided by the auto-negotiation component 238 in order to configure itself and a corresponding link partner to a compatible mode of operation. This encoded configuration register or next-page transmit register may be issued as a Configuration (/C/) code-group.

All of the above code-groups (except those of packet data) may in fact be a set of 10-bit code-groups in a specified order (i.e., ordered-sets). These ordered-sets are described in the further detail below.

The collision monitor and indicator component 312 may generate a collision detect signal (COL) for the GMII sublayer 210 if it detects simultaneous transmit and receive packet activity. It should be noted, however, that there may always be simultaneous physical signaling activity on a medium, since an Idle or Configuration code-group may always be sent in the absence of packet activity. Only simultaneous packet-data activity may constitute a collision. The collision monitor and indicator component 312 may also monitor the receiving indicator signal (receiving) from the receive component 232. If a collision has occurred, the collision monitor and indicator component 312 may set the collision detect signal (COL) to active.

The transmitting flag generation component 310 may generate the transmitting indicator signal (transmitting) for the carrier sense component 236 whenever the PCS transmit component 302 sends out data packets. As mentioned above, the receive component 232 may generate the receiving indicator signal (receiving) whenever it receives packets. The collision monitor and indicator component 312 may therefore check to see if the PCS transmit component 302 is both sending and receiving data simultaneously. If so (i.e., receiving=1 and transmitting=1), then the collision monitor and indicator component 312 may sent the collision detect signal (COL) to the GMII sublayer 206.

As mentioned above, the auto-negotiation xmit flag monitor component 320 may monitor the transmit flag signal (xmit) from the auto-negotiation component 238 to determine whether packet data transmission is permitted, or a link requires (re-)configuration. During reconfiguration, the PCS transmit component 302 may ignore packet data presented on the TXD<7:0> signal by the GMII sublayer 210 and instead may transmit a Configuration (/C/) ordered-set as directed by the auto-negotiation component 238.

Figure 4:
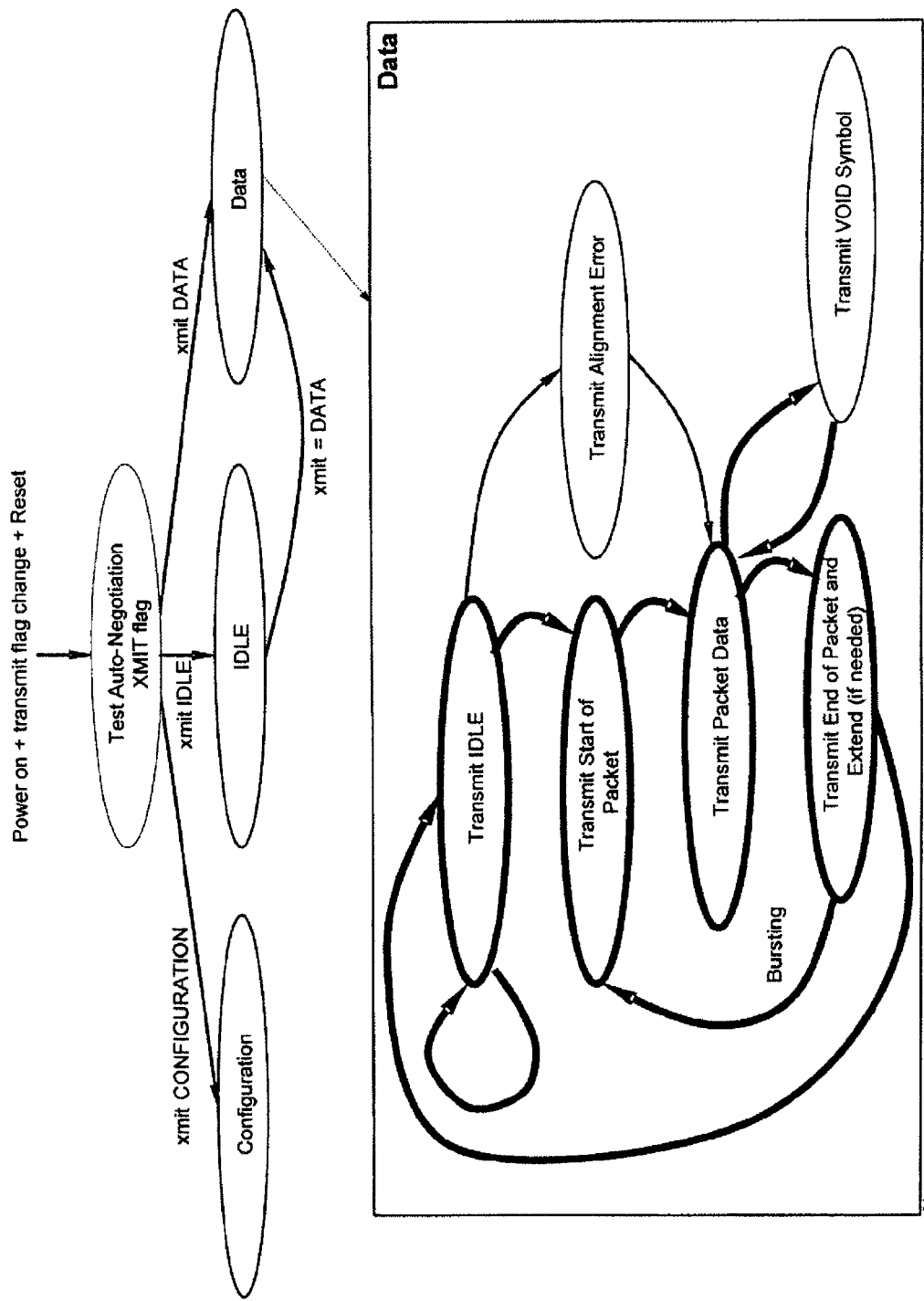
FIG. 4 shows a simplified state diagram for ordered-set transmission in a PCS transmit component in accordance with an embodiment of the present disclosure.

Referring to FIG. 4, there is shown a simplified state diagram for ordered-set transmission in the PCS transmit component 302 in accordance with an embodiment of the present disclosure. The PCS transmit component 302 may be in one of three states: transmitting Configuration (/C/), transmitting Idle (/I/), or transmitting Data (/D/). When in the transmitting Data state, packets may be transmitted according to the Data state diagram portion of FIG. 4. A normal path between states for a half-duplex mode (in the absence of errors) may be indicated by the bold transition paths. The transmit VOID state may be a normal state for repeaters because they may be required to retransmit all received frames, including errors. As such, a void code-group (/V/) may be inserted in an output frame wherever an invalid code-group has been received.

Referring again to FIG. 3, the transmit time transfer unit 306 may interface with the 8B10B encoder component 308 in the PCS transmit component 302 to coordinate the transmission of Time Service Ordered-Sets (TSOSs) and Time Service Data (TSD) code-groups in the tx_code-group<9:0> signal that is passed to the PMA sublayer 206. The Time Service Ordered-Sets (TSOSs) and Time Service Data (TSD) code-groups may be transmitted when the PCS transmit component 302 is in the transmitting Data (/D/) state, as shown in FIG. 4. The transmit time transfer unit 306 may generate Time Service Data (TSD) messages, capture timestamps, coordinate the transmission of Time Service Ordered-Sets (TSOSs) and Time Service Data (TSD) code-groups with the 8B10B encoder component 308, and interface with the transmit clock component 304 and a host processor (not shown) supplying time service data.

The transmit clock component 304 may provide a transmit timestamp signal, as well as a transmit timestamp read indication signal, to the transmit time transfer unit 306.

Referring again to FIG. 2, the carrier sense component 236 may monitor the transmit and receive packet data activity and assert a carrier sense signal (CRS) to the GMII sublayer 210, depending on the monitored activity and whether the PCS sublayer 208 is implemented in a repeater or end station application. If the PCS sublayer 208 is implemented in a repeater, the carrier sense signal (CRS) may be asserted only for receive-packet activity. The repeater may use the fact that multiple ports exhibiting activity of the carrier sense signal (CRS) may indicate a collision. If the PCS sublayer 208 is implemented in an end station, the carrier sense signal (CRS) may be asserted for either transmit or receive packet activity to assure a proper protocol is observed at the MAC sublayer. Thus, the carrier sense component 236 may assert the carrier sense signal (CRS) when the receiving indicator signal (receiving) or the transmitting indicator signal (transmitting)=1, and may deassert the carrier sense signal (CRS) when the receiving indicator signal (receiving) and the transmitting indicator signal (transmitting)=0. The carrier sense signal (CRS) may be asserted for repeaters when the receiving indicator signal (receiving)=TRUE state and deasserted when the receiving indicator signal (receiving)=FALSE state.

The synchronization component 234 operates to ensure lock to code-group boundaries and pass received code-groups to the receive component 232. That is, the synchronization component 234 may check that the PMA sublayer 206 is passing correctly aligned code-groups to the PCS sublayer 208. Since code-groups may be transmitted in a continuous bit stream over a medium at a specified rate (e.g., 1250 Mbaud), the synchronization component 234 may determine whether the PMA sublayer 206 is functioning dependably by detecting boundaries of the code bits and code-groups within this continuous stream. The synchronization component 234 may send a synchronization status signal (sync_status) to the auto-negotiation component 238 and, once it is sure that code-group boundaries are correct, it may also pass code-groups to the receive component 232.

The synchronization component 234 may require that a series of three consecutive "comma" containing code-groups be received, with no invalid code-groups between them, in order to achieve receiver/transmitter synchronization. Each comma may be followed by an odd number of valid data code-groups, as discussed in greater detail below. This may ensure that code-groups and ordered-sets are correctly detected and passed to the receive component 232.

The synchronization component 234 may continuously accept code-groups from the PMA sublayer 206 and convey received code-groups to the receive component 232. The synchronization component 234 may send the synchronization status signal (sync_status) to the auto-negotiation component 238 to indicate whether the PMA sublayer 206 may be functioning dependably.

Once synchronization is acquired, the synchronization component 234 may begin counting the number of invalid code-groups received. That count may be incremented for every code-group received that is invalid or contains a comma in an odd code-group position. That count may be decremented for every four consecutive valid code-groups received (a comma received in an even code-group position is considered valid). The count may never go below zero, and if it reaches four, the synchronization status signal (sync_status) may be set to indicate a failure.

Synchronization may be maintained while good code-groups continue to be detected. The synchronization component 234 may provides a hysteresis function such that in the event that invalid code-groups are detected, it may take a succession of invalid code-groups to cause loss of synchronization. The synchronization component 234 may be tolerant to a few errors in the received code-group stream. This may ensure that a short error burst, such as a noise event corrupting data on a medium, which affects only a small number of code-groups, may not cause loss of synchronization. However, longer error bursts, indicating a significant error condition or complete loss of received signal, may cause loss of synchronization, and code-group contents may no longer be considered reliable. Long error bursts may cause the synchronization component 234 to stop passing code-groups to the receive component 232 and to recheck code-group boundaries. At start-up, and at any time the PCS sublayer 208 has been unsynchronized for a predetermined time period (e.g., 10 ms or more), the auto-negotiation component 238 may trigger a link reconfiguration.

Auto-negotiating and manually configured devices may be unable to interpret received code-groups until synchronization has been acquired. Once synchronization has been acquired, the PCS sublayer 208 may then be able to receive and interpret the incoming code-groups.

The auto-negotiation component 238 may control what is transmitted by the transmit component 230 after synchronization has been acquired (i.e., the transmitting Configuration (/C/) state as shown above in FIG. 4). The auto-negotiation component 238 may then perform an auto-negotiation process. Once this auto-negotiation process has been completed, the auto-negotiation component 238 may then activate the transmit flag signal (xmit) for the transmit component 230. The transmit component 230 may then transmit packet data presented on the TXD<7:0> signal by the GMII sublayer 210. Thus, the auto-negotiation component 238 may set the transmit flag signal (xmit) to instruct the transmit component 230 to either transmit normal Idle code-groups interspersed with data packets received from the GMII sublayer 210 or to reconfigure the link.

The auto-negotiation component 238 may perform the following functions during the auto-negotiation process.

First, the auto-negotiation component 238 may negotiate whether a link may be operated in a half-duplex or full-duplex mode. Of course, link partners must be capable of operating in the same mode, either half- or full-duplex.

Second, the auto-negotiation component 238 may negotiate whether and how flow control may be used. Flow control may not be allowed with half-duplex links. If asymmetrical flow control is desired, agreement should be reached on which link partner may be allowed to initiate pause requests.

Thus, the auto-negotiation component 238 may test that a link is ready for operation, negotiate whether the link may be operational in half- or full-duplex mode, and negotiate whether and how flow control may be used. If these negotiations fail, link partners may be incompatible and communication may not be allowed. The auto-negotiation process should be complete before a link may be used to transmit frames.

To ensure that Configuration (/C/) code-groups are not incorrectly interpreted as Data (/D/) code-groups, two ordered-sets of the 8B/10B code (i.e., Configuration code groups /C1/ and /C2/, as shown below in FIG. 10) may be reserved exclusively for transmitting auto-negotiation configuration messages. Each ordered-set may be a sequence of 4 bytes; one for a /K28.5/ special code, one for /D21.5/ or /D2.2/ code-groups, and two for a 16-bit Auto-Negotiation Configuration Register (/Config_Reg[15:0]/). Local device capabilities (e.g., the operational mode it can support) may be encoded in the 16-bit Configuration Register, known as a base page. The 16-bit Configuration Register may include bits sufficient to specify the capabilities of the Physical Layer as well as an ACK(nowledgment) bit.

The two Configuration code-groups (/C1/ and /C2/) may be defined to enable an encoder to tightly control a running disparity (RD) of a code-group stream, as discussed in more detail below. Both link partners may transmit their configuration base page register to each other as a continuous code-group stream, alternating between /C1/ and /C2/ ordered-set sequences. Both /C1/ and /C2/ may contain comma sequences that may be used by a comma detect process in the PMA sublayer 206.

The Configuration Register data bits may be coded as third and fourth characters of the Configuration ordered-set. The auto-negotiation messages may be sent as a series of:
"/K28.5/D21.5/Config_Reg[7:0]/K28.5/D21.5/Config_Reg [15:8]/K28.5/D2.2/Config_Reg[7:0]/K28.5/D2.2/Config_Reg[15:8]/ . . . "
until the auto-negotiation process is complete, with each link partner learning and acknowledging another's capabilities and setting configuration appropriately (or detecting an error condition). Note that the order of transmission of the Configuration Register data may be encoded bits d0:d7 followed by encoded bits d8:d15. The transmitted bit stream bears little resemblance to the order of the Configuration Register.

The auto-negotiation process may involve the following actions: 1.) transmitting a local device's Configuration Register; 2.) receiving a Configuration Register of a remote link partner; 3.) acknowledging detection of the link partner's abilities; 4.) detecting an acknowledgment from the link partner; 5.) resolving a mode of operation (i.e., half-duplex or full duplex); and 6.) resolving a flow control operation by deciding a pause control mode.

Auto-negotiating devices may begin in the transmitting Configuration (/C/) state, as shown above in FIG. 4. Before data transmission may begin, auto-negotiating devices should receive three consecutive, consistent /C/ ordered-sets. Consistent /C/ ordered-sets should contain the same code-groups within the last two code-groups of each /C/ ordered-sets (ignoring an ACK(nowledge) bit). Once three consecutive, consistent /C/ ordered-sets have been received, the auto-negotiation process may look for three consecutive, consistent /C/ ordered-sets which have the ACK bit set to 1. After a period of time, the auto-negotiating devices may transition to the transmitting Idle (/I/) state, as shown above in FIG. 4. At this point, the auto-negotiating devices may begin transmitting /I/ ordered-sets. After another, period of time, the auto-negotiating devices may transition to the transmitting Data (/D/) state, as shown above in FIG. 4. At this point, the auto-negotiating devices may be able to transmit and receive data, assuming a partner device has also received three consecutive, consistent /C/ ordered-sets followed by three consecutive, consistent /C/ ordered-sets with the ACK bit set to 1. Manually configured devices may skip the process of transmitting /C/ ordered-sets and begin in the transmitting Data (/D/) state, as shown above in FIG. 4.

Figure 5:
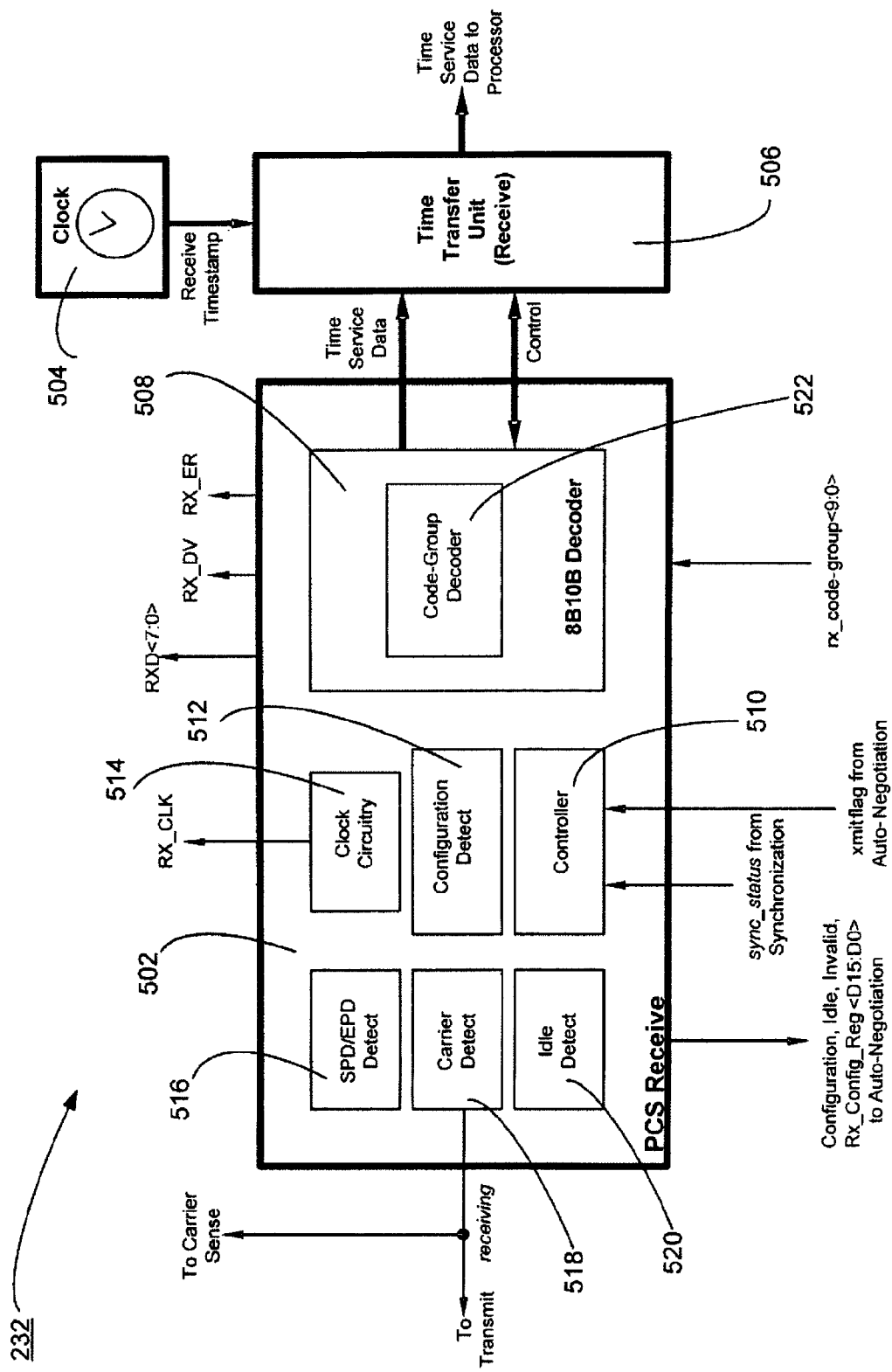
FIG. 5 shows a functional block diagram of a receive component in a PCS sublayer in accordance with an embodiment of the present disclosure.

Referring to FIG. 5, there is shown a functional block diagram of the receive component 232 in the PCS sublayer 208 in accordance with an embodiment of the present disclosure. The receive component 232 may comprise a PCS receive component 502, a receive clock component 504, and a receive time transfer unit 506. The PCS receive component 502 may comprise an 8B10B decoder component 508, a controller component 510, a Configuration detect component 512, clock circuitry 514, an SPD/EPD detect component 516, a carrier detect component 518, and an Idle detect component 520. The 8B10B decoder 508 may comprise a code-group decoder component 522.

The 8B10B decoder 508 may decode the 10-bit parallel encoded signal (rx_code-group<9:0>) that is received from the synchronization component 234 into the 8-bit parallel receive data signal (RXD<7:0>) that is transmitted to the GMII sublayer 210, or into Time Service Data (TSD) that is transmitted to the receive time transfer unit 506, as discussed in more detail below. That is, when a link is operating correctly an auto-negotiation process has completed, decoded 8-bit parallel receive data signal (RXD<7:0>) may be transmitted to the GMII sublayer 210, or decoded Time Service Data (TSD) may be transmitted to the receive time transfer unit 506, as discussed in more detail below. In this case, the decoding process may be essentially the reverse of the encoding process in the transmit component 230. Configuration code-groups or Idle code-groups may not be passed to the GMII sublayer 210 or to the receive time transfer unit 506, but instead are directed to the auto-negotiation component 238.

When a link is operating correctly an auto-negotiation process has completed, the receive component 232 may continuously accept code-groups from the synchronization component 234. The receive component 232 may monitor these code-groups and generate the 8-bit parallel receive data signal (RXD<7:0>), the RX_DV signal, and the RX_ER signal for the GMII sublayer 210, or decoded Time Service Data (TSD) for the receive time transfer unit 506, as discussed in more detail below. The receive component 232 may also generate the receiving indicator signal (receiving) for the carrier sense component 236 and the transmit component 230.

When the auto-negotiation component 238 sets the transmit flag signal (xmit) to indicate a Configuration or Idle state, the receive component 232 may direct Configuration ordered-sets, Idle ordered-sets, and the contents of a receive Configuration Register to the auto-negotiation component 238. All of these ordered-sets may be sent only to the auto-negotiation component 238 and not the GMII sublayer 210. As discussed above, during the auto-negotiation process, the transmit component 230 may not accept input from the GMII sublayer 210, but may instead transmit Configuration ordered-sets as directed by the auto-negotiation component 238.

Figure 6:
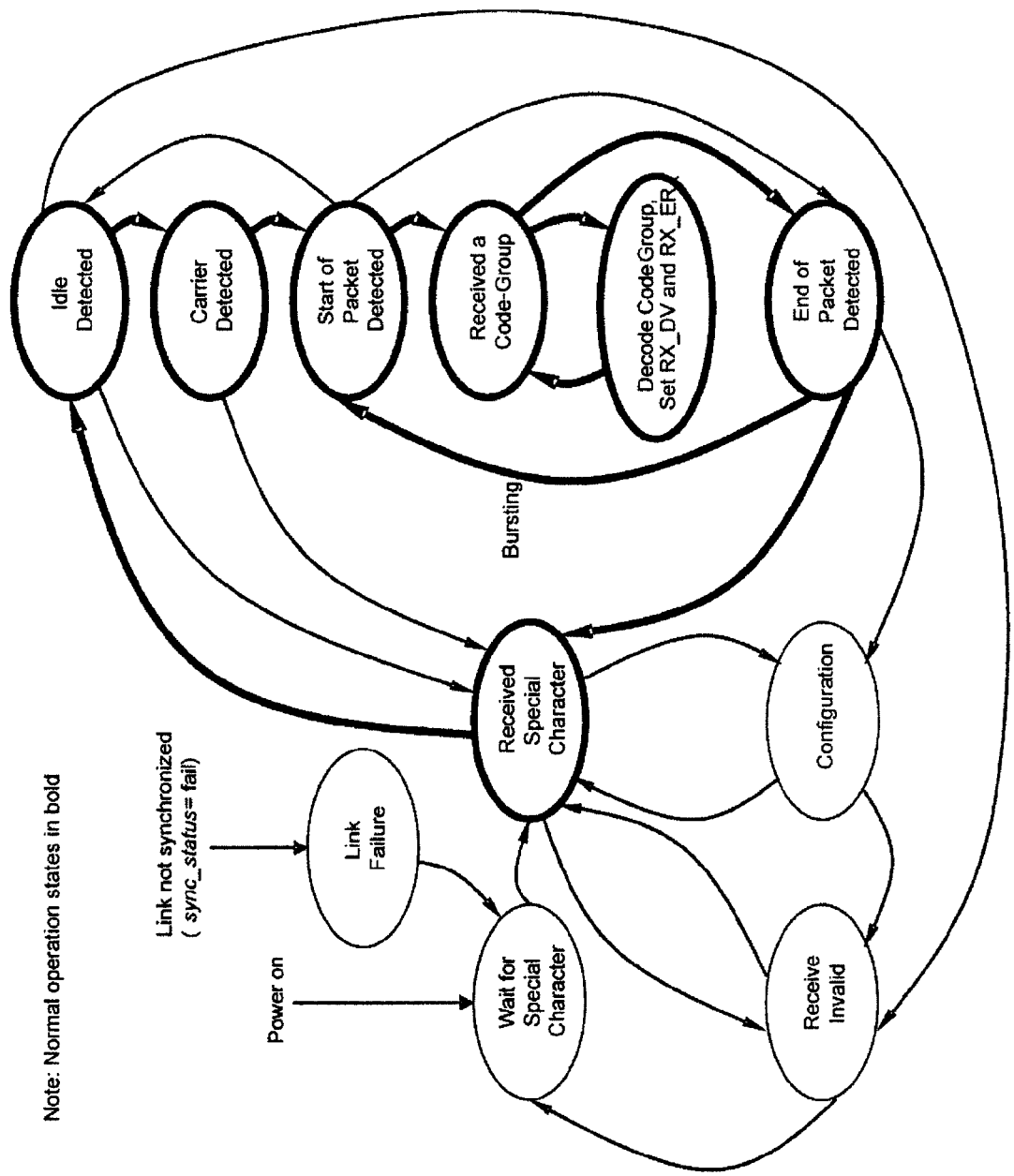
FIG. 6 shows a simplified state diagram for ordered-set reception in a PCS receive component in accordance with an embodiment of the present disclosure.

Referring to FIG. 6, there is shown a simplified state diagram for ordered-set reception in the PCS receive component 502 in accordance with an embodiment of the present disclosure. The PCS receive component 502 may monitor the transmit flag signal (xmit) and the code-groups being received for the following conditions: auto-negotiation transmit flag signal (xmit) detect (via controller component 510), carrier detect (via carrier detect component 518), Carrier_Extend (/R/) code-group detect (via controller component 510), code-group detect (valid decode) (via controller component 510), Start_of_Packet delimiter (SPD) (/S/) code-group detect (via SPD/EPD detect component 516), End_of_Packet (/T/) code-group detect (via SPD/EPD detect component 516), Error_Propagation (/V/) code-group detect (via controller component 510), Idle (/I/) code-group detect (via Idle detect component 520), and Configuration (/C/) code-group detect (via Configuration detect component 512). The PCS receive component 502 may also generate the RX_DV signal and the RX_ER signal for the GMII sublayer 210 to indicate when data and/or a packet delimiter sequence is valid or in error. The carrier detect component 518 may generate the receiving indicator signal (receiving) and pass it to both the transmit component 230 and the carrier sense component 236. The clock circuitry 514 generates the RX_CLK signal, which synchronizes the RXD<7:0> signal for the GMII sublayer 210.

During the auto-negotiation process, the PCS receive component 502 may enter a Configuration state (see FIG. 6), where it may detect, decode, and pass Configuration codes and the contents of a receive Configuration Register to the auto-negotiation component 238 until a link is configured. A transition from a "carrier detected" state to a "received special character" state may be caused by a false carrier detect. When this happens, the PCS receive component 502 may output the value 0000 1110 on the RXD<7:0> signal and set the RX_ER signal to a TRUE state.

Referring again to FIG. 5, the receive time transfer unit 506 may interface with the 8B10B decoder component 508 in the PCS receive component 502 to coordinate the reception of Time Service Ordered-Sets (TSOSs) and Time Service Data (TSD) code-groups in the rx_code-group<9:0> signal that is received from the synchronization component 234. The code-group decoder component 522 may analyze incoming PCS frames and detect Time Service Data (TSD) based on Time Service Ordered-Sets (TSOSs) in the frames. All Time Service Data (TSD) may be forwarded to the receive time transfer unit 506. For these timing frames, an exact arrival time and Time Service Data (TSD) may be captured by the receive time transfer unit 506.

Thus, the 8B10B decoder 508 may decode the 10-bit parallel encoded signal (rx_code-group<9:0>) that is received from the synchronization component 234 into the 8-bit parallel receive data signal (RXD<7:0>) that is transmitted to the GMII sublayer 210, or into Time Service Data (TSD) that is transmitted to the receive time transfer unit 506. That is, when a link is operating correctly and an auto-negotiation process has completed, decoded 8-bit parallel receive data signal (RXD<7:0>) may be transmitted to the GMII sublayer 210, or decoded Time Service Data (TSD) may be transmitted to the receive time transfer unit 506. As discussed above, the decoding process may be essentially the reverse of the encoding process in the transmit component 230. Configuration code-groups or Idle code-groups may not be passed to the GMII sublayer 210 or to the receive time transfer unit 506, but instead are directed to the auto-negotiation component 238.

The receive clock component 504 may provide a receive timestamp signal to the receive time transfer unit 506 for determining an exact arrival time of Time Service Data (TSD).

Figure 7:
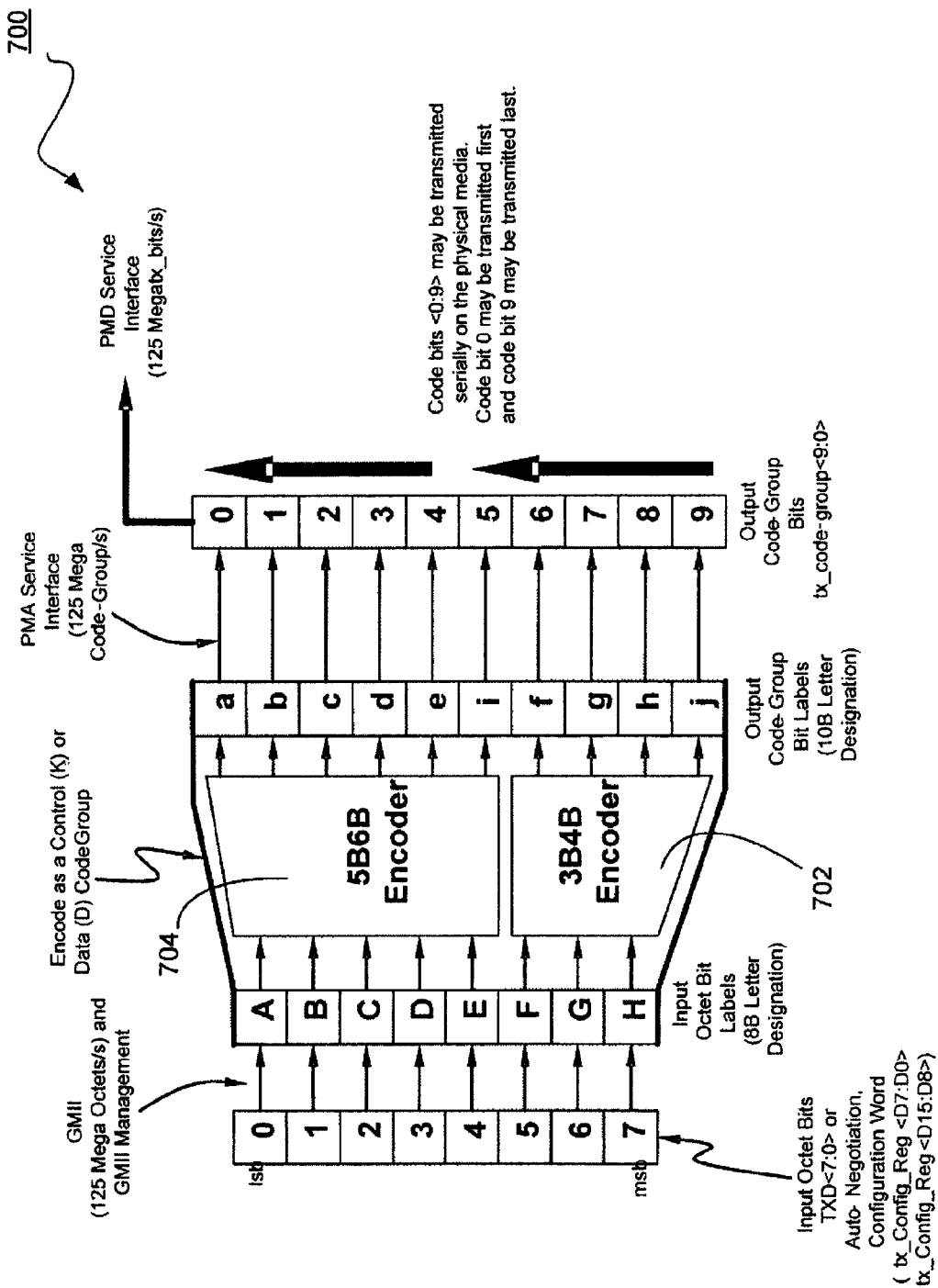
FIG. 7 shows an encoder for an 8B/10B coding scheme that splits data bytes into 3 bit (3B) and 5 bit (5B) portions in accordance with an embodiment of the present disclosure.

Referring to FIG. 7, there is shown an encoder 700 for an 8B/10B coding scheme that splits data bytes into 3 bit (3B) and bit (5B) portions in accordance with an embodiment of the present disclosure. The encoder 700 comprises a 3B/4B encoder 702 for encoding a 3B data byte portion and a 5B/6B encoder 704 for encoding a 5B data byte portion. FIG. 7 shows a translation from input data byte bits (TXD<7:0>) to input byte bit labels, to output code-group bit labels, to output code-group bits (tx_code-group<9:0>). The code-group bit 0 (least significant bit (lsb)) is the first bit transmitted, and code-group bit 9 (most significant bit (msb)) is the last transmitted bit for each code-group.

In the encoder 700 of FIG. 7, an 8B/10B code may be constructed from the 5B/6B and 3B/4B codes. A combined size of coding tables for the 5B/6B and 3B/4B codes is typically much smaller than a single coding table for the 8B/10B code. Also, combinational logic can be used to further simplify coding tables. Thus, implementations based on splitting data bytes into 3 bit (3B) and 5 bit (5B) portions can be very efficient.

As shown in FIG. 7, the 8 bits of the data byte are designated A, B, C, D, E, F, G, and H (lsb to msb). The encoder 700 translates the 8 bits of the data byte into a 10-bit code designated a, b, c, d, e, i, f, g, h, and j. The code-group is treated as two subgroups, one containing 6 code bits (a, b, c, d, e, and i) and one containing 4 code bits (f, g, h, and j). A given code is referred to by the shorthand /Dx.y/ (for data codes) or /Kx.y/ (for special codes), where x is the decimal value of EDCBA (E being the msb of the string) and ranges from 0-31 and y is the decimal value of HGF (H being the msb of the string) ranging from 0-7. The encoded 10B code-groups are transmitted (and received) serially in the order abcdeifghj. Some examples of Data (D) and Special (K) Codes are shown in FIG. 8.

As shown in FIG. 7, the 8-bit unencoded value is effectively broken into two sub-blocks. A 5-bit sub-block, represented by the bits ADCDE of the input byte, is encoded into a 6-bit sub-block represented by the bits abcdei. A 3-bit sub-block, represented by the bits FGH of the input byte, is encoded into a 4-bit sub-block represented by the bits fghj. As described in greater detail below, each sub-block has a "disparity" value associated with it. A disparity represents a difference between a number of zeros or ones in an encoded word (i.e., code-group). Several disparity conditions may be defined. First, a neutral disparity indicates that the number of zeros and ones is equal. Second, a positive disparity indicates that there are more ones than zeros. Third, a negative disparity indicates there are more zeros than ones.

The encoder 700 is preferably designed to maintain a neutral average disparity. Average disparity is important because it determines a DC component of a serial line. In order to ensure that a 10B-encoded signal can be AC-coupled onto a medium (for example, pass through a transformer or capacitor) without distortion or the use of a bandwidth-increasing code, the number of ones and zeros in the encoded stream should be equal over time for any arbitrary data transmission. Also, the maximum number of consecutive ones or zeros should be minimized (even if the long-term averages are equal) so as to avoid any short-term DC offset. This may be called minimizing the run length of the code.

Every 10-bit code-group (both data and control codes) should fit into one of the following possibilities, which helps limit the number of consecutive ones and zeros between any two code-groups: 5 ones and 5 zeros, 6 ones and 4 zeros, or 4 ones and 6 zeros. Some of the possible 1024 codes may be excluded to leave only code-groups with a run-length of 5 consecutive equal bits, and the difference between the number of zeros and ones may be not more than 2. Thus, the usable code-groups may be carefully chosen out of the $2^{10}$=1024 possible code-groups.

The code-groups used for data codes should not generate more than 4 consecutive ones or zeros, or not have an imbalance of greater than one. The codes that have a large number of consecutive ones or zeros or that are highly unbalanced should not be used for data (some are used for special codes, as discussed in greater detail below. This is one advantage of using a large code space: there are 1024 available codes for 256 possible data values, so those codes that have undesirable properties can simply be discarded.

In addition to selecting only the most balanced codes, two 10B encodings for every 8B groups may be defined. If the 10B encoding chosen for a given value has the same number of ones and zeros (five of each), then the two 10B encodings may be the same. This would be a perfect balanced code point requiring no compensation. The code for /D3.1/ (i.e., 8B bits [HGF EDCBA]=[001 00011] and 10B bits [abcdei fghj]= [110001 1001]) in FIG. 8 is an example of a balanced code point.

If the 10B encoding has more ones than zeros (or more zeros than ones), then the alternate encoding may use the inverse of the bits within the subgroups [abcdei] or [fghj] (or both) in which the imbalance occurs. An exception may be made in special code groups, in which the second encoding may always be the inverse of the first, regardless of balance. Thus, /D23.2/ ([HGF EDCBA]=[010 10111]) in FIG. 8 has two different valid encodings: [abcdei fghj]=[111010 0101] and [abcdei fghj]=[000101 0101]. Since the [abcdei] subgroup has more ones than zeros, the second encoding may use the inverse of this subgroup (which has more zeros than ones). To prevent long runs of ones or zeros, which may make clock synchronization more difficult at a receiver (even in balanced codes), the rules for determining the alternate coding for a given code point may also invert patterns of [111000] and [1100] (and their inverses) in the [abcdei] and [fghj] subgroups, respectively.

A transmitter may keep a running tally, on a code-group by code-group basis, of whether there have been more ones than zeros transmitted or more zeros than ones. Since a code-group may comprise (at most) an imbalance of only one additional one or zero, only a single bit of information may be required for the running tally. This may be called a running disparity (RD).

The RD may be a measure of whether patterns are "leaning" toward too many ones (RD+ or positive parity) or toward too many zeros (RD− or negative disparity). Thus, the RD may be a record of the cumulative disparity of every encoded word, and may be tracked by the encoder 700.

The 8-bit code-groups may be encoded based upon a current running disparity value. To guarantee a neutral average disparity, a positive RD should be followed by a neutral or negative disparity and a negative RD should be followed by a neutral or positive disparity.

The encoder 700 may select one of two possible codes for each transmitted byte depending on whether the current running disparity is positive or negative, as shown in FIG. 8. That is, if a current RD is negative, then an encoded value may come from the Current RD(−) column. The Current RD(−) column contains code-groups which do not contain more zeros than ones. This is because, in the absence of errors, a current negative RD value shows that more zeros have been transmitted than ones, and so a code-group with more ones than zeros should be transmitted before another code-group with more zeros than ones is transmitted. Also, if a current RD is positive, then an encoded value may come from the Current RD(+) column. The Current RD(+) column contains no code-groups which contain more ones than zeros for the opposite reasons above. It should be noted that it is possible for the 10-bit code-group to be identical for both columns of a given code-group (e.g., /D21.5/).

As a result of a given code-group being transmitted, the running disparity may either invert ("flip") or be left the same. Thus, a very tight DC balance may be maintained over an entire sequence of transmitted code-groups. In addition, a receiver may detect many errors by checking the disparity of received code-words. Since a transmitter should never attempt to move the DC balance between code-groups by more than 1 bit either way, a code-group so received may be assumed to be an error.

Many of the 256 code-groups that represent the 8-bit values may be disparity neutral. That is, both the 6-bit and 4-bit sub-blocks may have the same number of zeros and ones. The RD at the end of each code-group may be continuously maintained as either positive or negative in a transmitter and checked at a receiver. A value of the RD may be calculated by using a disparity of each sub-block and an RD value of a previous sub-block. Each 4-bit or 5-bit sub-block may be permitted to have a disparity of +2, 0, or −2 within the sub-block and a disparity of +1 or −1 (positive or negative, respectively) at a beginning and end of each sub-block.

Similar to FIG. 8, 5B/6B and 3B/4B code tables may have two encoded bit columns called Current RD(+) and Current RD(−) for 6B and 4B sub-blocks, where Current RD may refer to the state of the RD at an end of a last sub-block. 8B/10 code-groups may be constructed from these split code tables using a few rules.

First, the RD for a code-group may be calculated on the basis of sub-blocks, where the first 6 bits (abcdei) form one sub-block and the second 4 bits (fghj) form the other sub-block. That is, the RD at the beginning of the 6-bit sub-block is the RD at the end of the last code-group. Also, the RD at the beginning of the 4-bit sub-block is the RD at the end of the 6-bit sub-block. Further, the RD at the end of the code-group is the RD at the end of the 4-bit sub-block.

Second, the RD for a sub-block may also be calculated on the basis of sub-blocks. That is, the RD at the end of any sub-block is positive if the sub-block contains more ones than zeros. The RD at the end of any sub-block is also positive at the end of the 6-bit sub-block if the 6-bit sub-block is 000111, and the RD at the end of any sub-block is further positive at the end of the 4-bit sub-block if the 4-bit sub-block is 0011. Also, the RD at the end of any sub-block is negative if the sub-block contains more zeros than ones. The RD at the end of any sub-block is also negative at the end of the 6-bit sub-block if the 6-bit sub-block is 111000, and the RD at the end of any sub-block is also negative at the end of the 4-bit sub-block if the 4-bit sub-block is 1100. Further, if none of the above apply, the RD at the end of the sub-block is the same as at the beginning of the sub-block.

Third, all sub-blocks with equal numbers of zeros and ones are disparity neutral. In order to limit the run length of zeros or ones between sub-blocks, the following rules apply. First, sub-blocks encoded as 000111 or 0011 are only generated when the RD at the beginning of the sub-block is positive. Thus, the RD at the end of these sub-blocks is also positive. Likewise, sub-blocks containing 111000 or 1100 are only generated when the RD at the beginning of the sub-block is negative. Thus, the RD at the end of these sub-blocks is also negative. Second, the code-groups D11.7, D13.7, D14.7, D17.7, D18.7, and D20.7 must use the alternative 4B encoding.

A transmitter may assume a negative value for an initial RD after powering on (start-up) or exiting a test mode. It may calculate a new value for the RD based on each code-group it transmits. Code-groups that are disparity neutral may not change the value of the RD (e.g., D5.6 in FIG. 8, which has 8B bits [HGF EDCBA]=[110 00101], 10B bits Current RD(−)= [abcdei fghj]=[101001 0110] and 10B bits Current RD(+)= [abcdei fghj]=[101001 0110]). Non-neutral disparity code-groups may flip the value of the RD. Also, 8B/10B encoding tables may be used to determine the proper encoding of a next data byte. For example, assume that the current RD is positive, and the next byte to be transmitted is D2.2 as shown in FIG. 8 (i.e., 8B bits [HGF EDCBA]=[010 00010], 10B bits Current RD(−)=[abcdei fghj]=[101101 0101] and 10B bits Current RD(+)=[abcdei fghj]=[010010 0101]). The encoding for D2.2 should be taken from the "Current RD(+)" column.

After powering on or exiting a test mode, a receiver may assume either a positive or negative value for an initial RD. On receipt of code-groups, it may determine the validity of the code-group and calculate a new value of RD based on the received code-group. The RD value may be used as an additional error check at the receiver, since the transmitted value may be defined to ensure that the RD may be maintained either positive or negative (i.e., not zero or greater than +1 or less than −1).

From a receiver's point of view, if a received code-group is in a correct column of an 8B/10B encoding table, depending on the current RD, it may be considered valid and may be decoded and appropriate action may be taken dependent on its contents. For data code-groups, an associated data byte may be determined (decoded). If a received code-group is in an incorrect column of an 8B/10B encoding table, it may be considered invalid. Invalid code-groups may result in loss of synchronization if enough of them are detected. However, regardless of the validity of the code-group, it may be used to compute a new value of the RD for the receiver.

Detection of an invalid code-group may not necessarily indicate that the code-group in which the invalid code-group was detected is in error. Invalid code-groups may result from a prior error which altered the RD of a bit stream, but which did not result in a detectable error at the code-group in which the error occurred. The number of invalid code-groups detected may be proportional to the bit-error-rate (BER) of the link. Link monitoring may be performed by counting invalid code-groups.

Figure 9:
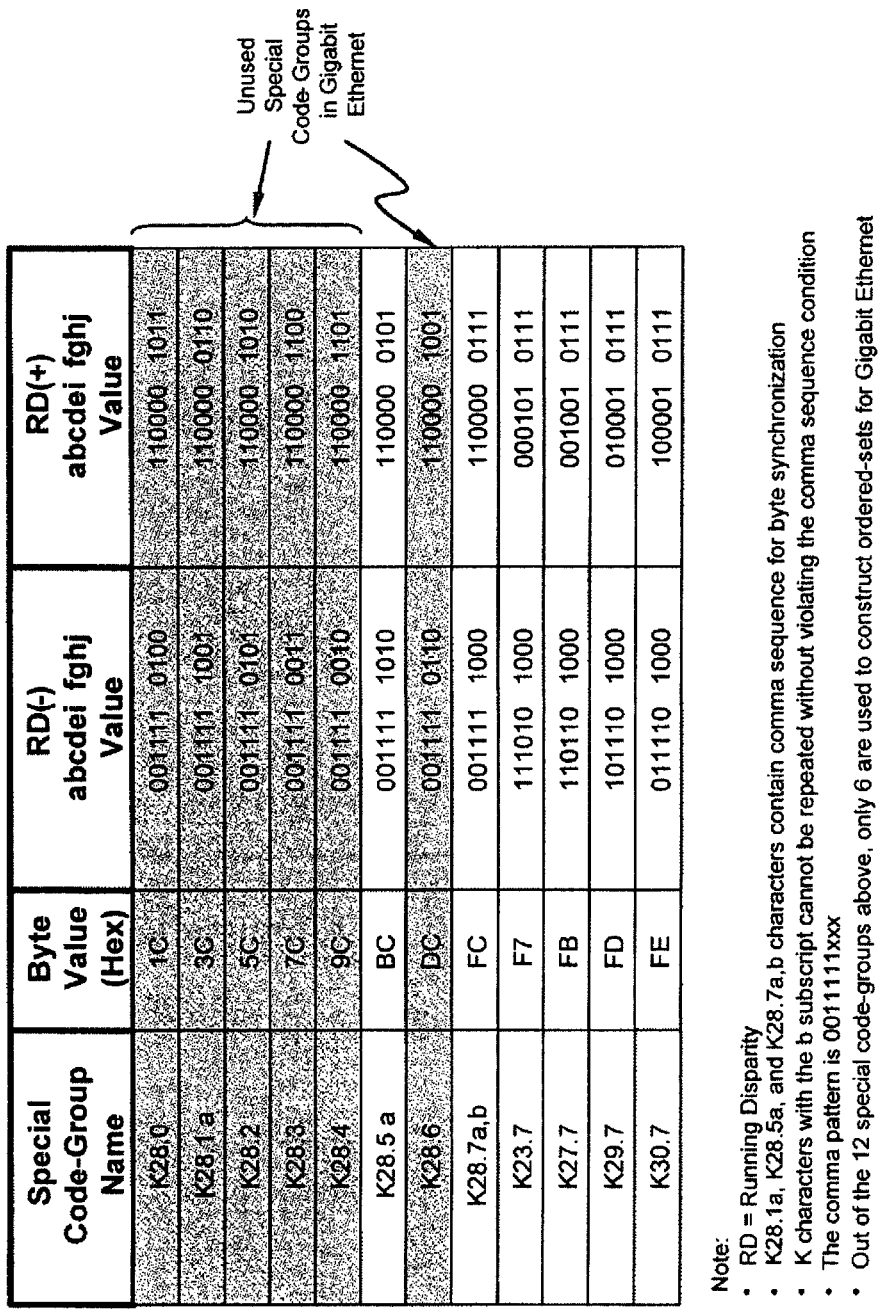
FIG. 9 shows special code-groups for Gigabit Ethernet in accordance with an embodiment of the present disclosure.

Control and management information, as opposed to data, may be communicated through the transmission of special recognizable bit patterns referred to herein as ordered-sets. Ordered-sets may be 1, 2, or 4 code-groups in length, and may begin with a code from a special code-group. FIG. 9 comprises a list of special code-groups.

A first code-group after power-up or reset may be considered even and code-groups that follow the first code-group may alternate between odd and even. 10-bit code-groups may be categorized into data (/Dx.y/), special (/Kx.y/), and invalid code-groups. IEEE Standard 802.3 contains a table of all valid encodings of data bits 00-FF. Invalid code-groups may be 10-bit code-groups which have not been defined in the IEEE Standard table of valid encodings, and those code-groups which are received or transmitted with an incorrect RD.

Only 12 of the control (K) code-groups are defined as valid control code-groups for Gigabit Ethernet. The use of special codes makes ordered-sets easily distinguishable from data. This distinction allows both data and control information to be passed unambiguously across the same communications channel. Ordered-sets may provide an "out-of-band" signaling method.

Out of the 12 special code-groups shown in FIG. 9, only 6 may be used to construct ordered-sets for Gigabit Ethernet. Gigabit Ethernet defines and uses eight such ordered-sets, as shown in FIG. 10. These eight ordered-sets may be categorized as Configuration ordered-sets, Idle ordered-sets, and Encapsulation ordered-sets.

The Configuration ordered sets may be used for auto-negotiation of link characteristics. Specifically, the ordered-sets /C1/ and /C2/ may be used to convey the contents of a 16-bit configuration register:
/C1/=/K28.5/D21.5/Config_Reg[7:0]/Config_Reg[15:8]/
/C2/=/K28.5/D2.2/Config_Reg[7:0]/Config_Reg[15:8]/

The /K28.5/ code-group may be used as a first code-group because it contains a comma, which is a unique data pattern as discussed above. Receipt of this code-group may not occur during a data packet unless there is a data error. This makes it very useful for use with very specific ordered-sets such as configuration and idle. Code-groups /D21.5/ and /D2.2/ were chosen for their high bit transition density (see FIG. 8). Continuous repetition of ordered set /C1/ alternating with ordered-set /C2/ may be used to convey the contents of the 16-bit configuration register.

Ordered-set /C1/ may flip a current RD after a transmission of code-group /D21.5/. This is because code-group /K28.5/ may flip the RD and code-group /D21.5/ may maintain the current RD.

Ordered-set /C2/ may sustain a current RD after a transmission of code-group /D2.2/. This is because both code-group /K28.5/ and code-group /D2.2/ may flip the current RD.

For an identical value of the configuration register, the /C1/ ordered-set may change the RD at the end of a transmitted /C1/ ordered-set to opposite the RD at the start. The /C2/ ordered-set may keep the RD at the end of a transmitted /C1/ ordered-set at the same RD as at the start.

The Idle ordered-sets (/I/) may be used between transmissions. They may be transmitted continuously and repetitively whenever there is no transmit activity from the GMII sublayer (e.g., TX_EN and TX_ER are both inactive). The ordered-sets /I1/ and /I2/ may be transmitted to provide a continuous fill pattern to establish and maintain clock synchronization and to delimit packet data. Periodic transitions are required to maintain synchronization of a receive clock. The /I/ ordered-sets may have a high transition density to keep a receiver in optimum sync during a high-frequency Idle ordered-set sequence. Distinct carrier events may be separated by Idle ordered sets. When a receiver sees an Idle ordered-set, it may drop a carrier.

The /I1/ ordered-set may comprise a negative disparity /K28.5/ code-group (10-bit 0x283) followed by a /D5.6/ code-group. The /D5.6/ code-group (see FIG. 8) has the same value, 10-bit 0x1A5, for positive and negative disparity versions and has a balanced 10-bit code. The /I1/ ordered-set should be transmitted only once if the RD is positive before transmitting the /I1/ ordered-set. The /I1/ ordered-set may change the RD at the end of a transmitted /I1/ ordered-set to opposite the RD at the start.

The /I2/ ordered-set may comprise a positive disparity /K28.5/ code-group (10-bit 0x17C) followed by a negative disparity /D16.2/ code-group (10-bit 0x289). The /I2/ ordered-set may start an Idle ordered-set sequence if the RD is negative before starting the Idle ordered-set sequence. Otherwise, the /I2/ ordered-set may follow the /I1/ ordered-set and be continually transmitted, maintaining a negative RD until the end of a sequence of transmitted code-groups. The /D5.6/ code-group and the /D16.2/ code-group were chosen for their high bit transition density (see FIG. 8).

The /I/ ordered-sets may be transmitted to ensure that the RD is negative. The /I1/ ordered-set and the /I2/ ordered-set may be used to control the RD of a code-bit stream. The /I1/ ordered-set may change the RD, while the /I2/ ordered-set may maintain the RD. If the RD is positive before an Idle ordered-set, an /I1/ ordered-set may be chosen. If the RD is negative before an Idle ordered-set, an /I2/ ordered-set may be chosen. The first Idle ordered-set following a packet or a Configuration ordered-set may restore a current positive or negative RD to a negative value. Only one Idle ordered-set may be required for this purpose. All subsequent Idle ordered-sets may be /I2/ ordered-sets to ensure a negative ending RD.

Thus, the use of /I1/ and /I2/ ordered-sets may produce the following behavior. The RD at the end of an /I1/ ordered-set may be the opposite of the RD at the beginning of the /I1/ ordered-set. However, the RD at the end of an /I2/ ordered-set may be the same as the RD at the beginning of the /I2/ ordered set (i.e., right before transmitting the /I2/ ordered-set). The /I2/ ordered-set may keep the RD at the end of a transmitted /I1/ ordered-set at the same RD as at the start. This ensures a negative RD at the end of an Idle ordered-set.

The Encapsulation ordered-sets may comprise a Start_of_Packet or Start_of_Packet Delimiter (SPD) ordered-set (/S/), an End_of_Packet ordered-set (/T/), a Carrier_Extend ordered-set (/R/), and an Error_Propagation ordered-set (/V/).

The Start_of_Packet or Start_of_Packet Delimiter (SPD) ordered-set (/S/) may be used to indicate a start of a data transmission sequence. The TX_EN signal may be asserted with the first byte of a preamble and may remain asserted for the whole of a MAC frame (see FIG. 11). When the TX_EN signal goes active, the current (first) byte of a MAC preamble may be replaced with an /S/ ordered-set. At the start of data reception at a receiver, the /S/ ordered-set may be replaced by a first byte of a MAC preamble. The /S/ ordered-set follows an /I/ ordered-set for a single packet or a first packet of a burst of packets. The /S/ ordered-set follows an /R/ ordered-set for a second and subsequent packets of a burst of packets.

The MAC preamble of an Gigabit Ethernet packet comprises a 56-bit (7-byte) pattern of alternating 1 and 0 bits (where the last bit is a zero), which allows connected network devices to easily detect a new incoming frame. The MAC preamble allows the Physical Layer to detect a carrier and to reach steady-state synchronization with an incoming frame before an actual Start-of-Frame Delimiter (SFD) has been received.

Figure 11:
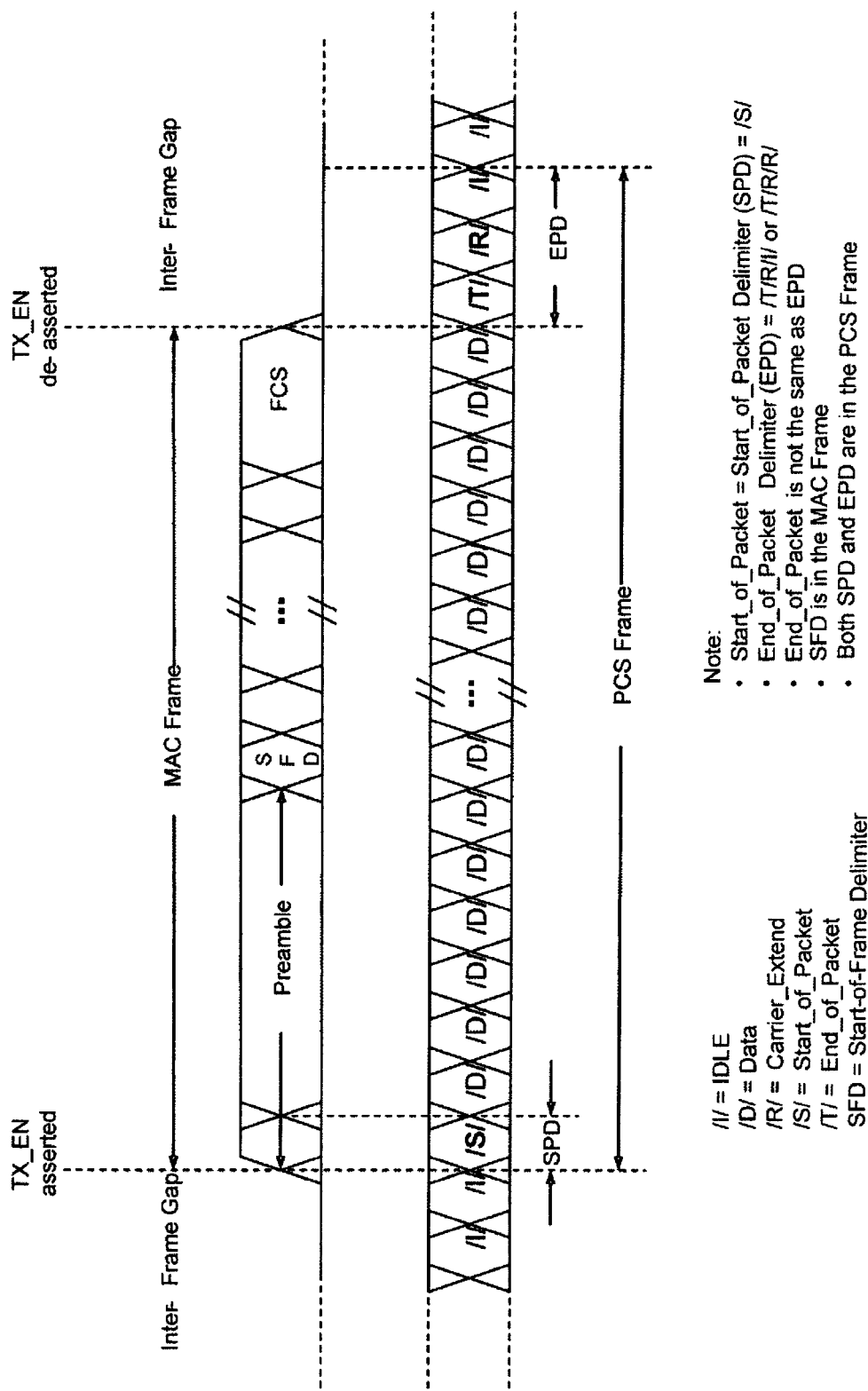
FIG. 11 shows a PCS encapsulation of a MAC frame in accordance with an embodiment of the present disclosure.

The End_of_Packet ordered-set (/T/) may be used to indicate an end of a data transmission sequence. It is typically the first ordered-set that indicates the end of a data transmission sequence. The /T/ ordered-set may be used by a device to assist in quick deassertion of a carrier indication. As illustrated in FIG. 11, the TX_EN signal may be deasserted at the end of a frame check sequence (FCS) of a MAC frame being transmitted, and then the /T/ ordered-set may be transmitted.

An End_of_Packet Delimiter (EPD) may comprise either /T/R/R/ code-groups or /T/R/K28.5/ code-groups. The /K28.5/ code-group typically occurs as a first code-group of the /I/ ordered-set. The EPD may be transmitted following each deassertion of the TX_EN signal, which may follow a last data byte of the FCS of the MAC packet.

A receiver may consider a MAC inter-packet gap (IPG) to have begun two bytes prior to transmission of the first /I/ ordered-set after the EPD (see FIG. 11). For example, when a packet is terminated by EPD, the /T/R/ code-groups portion of the EPD may occupy part of a region considered to be a MAC IPG.

The Carrier_Extend ordered-set (/R/) may be used for multiple purposes. First, the /R/ ordered-set may be used to indicate a carrier extension during a burst of packets. Second, the /R/ ordered-set may be used to separate packets within a burst of packets. Third, the /R/ ordered-set may be used to form a first /R/ ordered-set following a /T/ ordered-set in an EPD /T/R/I/ or /T/R/R/I/ ordered-set sequence. If the /T/ ordered-set is transmitted as an even-number character, and there is no carrier extension, exactly one /R/ ordered-set may be transmitted after the /T/ ordered-set. Fourth, the /R/ ordered-set may be used to form a second /R/ ordered-set following a /T/ ordered-set in an EPD /T/R/R/I/ ordered-set sequence. This /R/ ordered-set may be used, if necessary, to pad the only or last packet of a burst of packets so that a subsequent /I/ ordered-set may be aligned on an even-numbered code-group boundary (i.e., ensure a correct code-group alignment of a first Idle ordered-set after packet transmission).

The Error_Propagation ordered-set (/V/) may be used to indicate a collision or an error condition. Invalid code-groups are not intentionally transmitted onto media by end stations. The detection of an invalid code-group may be an indication that a receiver is out of synchronization. An invalid code-group is recognized by a receiver when one of the following conditions is detected: 1.) a code violation is detected within a code-group; 2.) a special code-group alignment error is detected (e.g., a /K28.5/ code-group is received as an odd-numbered code-group, a non-/K28.5/ special code-group immediately follows a /K28.5/ code-group, a non-supported special character is detected, etc.); 3.) an ordered-set with improper beginning RD is received.

The Error_Propagation ordered-set (/V/) may be used to indicate transmission of an error or invalid code to other connected network devices. The /V/ ordered-set may be transmitted upon assertion of the TX_EN and TX_ER signals, or assertion of the TX_ER signal with deassertion of the TX_EN signal while the TXD<7:0> signal is not equal to 0F. Reception of the /V/ ordered-set or an invalid code-group (the result of a collision or an error condition) may be indicated by asserting the RX_ER signal and setting the RXD<7:0> signal to the appropriate value.

The 8B/10B encoding of the /K28.5/ special code-group (see FIGS. 8 and 9) comprises the abcdeif 7-bit pattern 0011111 (comma+), or its inverse the abcdeif 7-bit pattern 1100000 (comma−). Each of these comma bit patterns is unique in that it contains five sequential one or zeros. Each of these comma bit patterns, in absence of transmission errors, may not appear within a transmitted code-group, and may not occur across boundaries of two adjacent code-groups.

The /K28.5/ special code-group comprises a comma bit pattern followed by an alternating sequence of zeros and ones (i.e., 00111110101' or 1100000101') and was consciously selected for use in the Configuration and Idle ordered-sets. This overall bit pattern may provide an easy way to align and synchronize an incoming bit stream at link startup and between frames. The comma bit pattern may be used by the PMA sublayer 206 to align an incoming serial stream. That is, it may be used to easily find and verify character and word boundaries of a received bit stream. The comma bit pattern may also be used by the PCS sublayer 208 to acquire and maintain synchronization. Bits ghj of the /K28.5/ special code-group present a maximum number of transitions, simplifying receiver acquisition of bit synchronization.

As discussed above, Gigabit Ethernet uses the 8B/10B coding scheme, which ensures that unless an error occurs, the comma bit pattern is unique to the /K28.5/ special code-group. The /K28.5/ special code-group is the only code-group comprising a comma bit pattern used in normal operation for Gigabit Ethernet. The comma bit pattern may not occur across boundaries of any two adjacent code-groups unless an error has occurred. Although the /K28.7/ special code-group also comprises a comma bit pattern, it is reserved for diagnostics usage. Also, the /K28.7/ special code-group should be used with care because this code-group, in combination with some others (/K28.x/, /D3.x/, /D11.x/, /D12.x/, /D19.x/, /D20.x/, or /D28.x/ code-group, where x is a value from 0 to 7), may generate a comma bit pattern that is not code-group aligned (i.e., causes a comma bit pattern to be generated across boundaries of two code-groups). The 10-bit /K28.5/ special code-group may be used to prevent a 7-bit comma bit pattern from being detected across boundaries when a /K28.7/ special code-group is followed by a /K28.x/, /D3.x/, /D11.x/, /D12.x/, /D19.x/, /D20.x/, or /D28.x/ code-group, where x is a value from 0 to 7. Another special code-group, /K28.1/, also comprises a comma bit pattern, but this special code-group is not used in Gigabit Ethernet.

A primary function of the PCS sublayer 208, after device start-up, is the encapsulation of MAC frames into code-group streams for transmission by the PMA sublayer 206 and the PMD sublayer 204. The PCS sublayer 208 may accept packets from the MAC sublayer (through the Reconciliation sublayer and the GMII sublayer 210) and encapsulate them into a code-group stream. The PCS sublayer 208 may decode a code-group stream received from the PMA sublayer 206, extract packets from it, and pass the packets to the MAC sublayer (through the Reconciliation sublayer and the GMII sublayer 210). The encapsulation process of a MAC frame is shown in FIG. 11. A reception and de-encapsulation process in the PCS sublayer 208 is essentially the reverse of the encapsulation and transmission process.

The TX_EN, TX_ER, RX_DV, and RX_ER signals may play an important part in the encapsulation and de-encapsulation of MAC frames. These signals, along with the TXD<7:0> and RXD<7:0> signals, may be used to indicate the state of the MAC sublayer (e.g., whether the MAC sublayer is transmitting a normal data frame or a control signal).

As discussed above, the /S/ and /T/ ordered-sets may be used as delimiters that indicate a beginning and an end of a PCS transmitted frame, respectively. The /S/ and /T/ ordered-sets may delimit a data bit stream in a Physical Layer encapsulation, denoting an end of an idle ordered-set or an inter-frame gap and a beginning of a preamble (see FIG. 11). This may be distinct from a Start-of-Frame Delimiter (SFD) used by the Data Link Layer to indicate an end of a preamble and a beginning of a destination address.

The Start Frame Delimiter (SFD) may be an 8-bit (1-byte) value marking an end of a preamble of a Gigabit Ethernet frame. The SFD may be immediately followed by a destination MAC address. It may have a value 10101011 that continues an alternating bit pattern of a preamble (and two is in the last two bit positions may identify an end of a preamble sequence). The SFD may be designed to break this pattern, and signal a start of an actual frame. The SFD may be signaled "in-band," as opposed to "out-of-band" signaling that may be used by the /S/ ordered-set. The IEEE Standard 802.3 uses the term "Start of Packet Delimiter" for the /S/ ordered-set rather than "Start of Frame" to indicate this differentiation.

Data packets are transmitted according to the following requirements. First, an /I/ ordered-set should be transmitted in an even code-group position. Second, an /I/ ordered-set should precede the /S/ ordered-set for a first packet of a burst of packets or an only packet of a non-burst of packets. This means that the /S/ ordered-set may be transmitted in an even code-group position if it follows an /I/ ordered-set. Third, the /R/ ordered-set should precede the /S/ ordered-set for a second and subsequent packets within a burst of packets. Fourth, the /S/ ordered-set may be transmitted in an even or odd code position when following the /R/ ordered-set.

Referring to FIG. 12, there is shown a table indicating when a Start_of_Packet Delimiter (SPD) ordered-set (/S/) may be transmitted in accordance with an embodiment of the present disclosure. As shown in FIG. 12, the /S/ ordered-set should be transmitted in an even code-group position when following an /I/ ordered-set.

Referring to FIG. 13, there is shown a table indicating when an End_of_Packet Delimiter (EPD) may be transmitted with /T/R/K28.5/ code-groups in accordance with an embodiment of the present disclosure. As shown in FIG. 13, the EPD sequence should be transmitted when the /T/ code-group falls in an even code-group position. In this case, an /I/ ordered-set may also fall in an even code-group position.

Referring to FIG. 14, there is shown a table indicating when an End_of_Packet Delimiter (EPD) may be transmitted with /T/R/R/ code-groups in accordance with an embodiment of the present disclosure. As shown in FIG. 14, when the /T/ code-group falls in an odd code-group position, a /T/R/K28.5/ EPD may not suffice because it would cause an /I/ ordered-set to fall in an odd code-group position.

Referring back to FIG. 2, the PCS sublayer 208 may interpret the TX_EN, TX_ER, and TXD<7:0> signals and transmit ordered-sets based thereon. As shown in Table 1, the TX_EN signal is asserted whenever a packet is being sent. If the GMII sublayer 210 recognizes an error during data transmission, it will assert the TX_ER signal as well as alert the PCS sublayer 208 to send a /V/ code-group. The TX_ER signal is used to indicate a transmission error, except when transmitting a carrier extension.

The TX_EN signal is deasserted when the FCS field has been transmitted. A carrier extension may be transmitted after a packet when the TX_EN signal and the TX_ER signal are both flipped so that the TX_EN signal=0 and the TX_ER signal=1 and the TXD<7:0> signal is not equal to 0F, then the PCS sublayer 208 may consider it an error and transmit a /V/ ordered-set.

If the TX_EN signal=0 and the TX_ER signal=0, then the PCS sublayer 208 may transmit an /I/ ordered-set.

TABLE 1

| TX_EN | TX_ER | TXD<7:0> | Indication | Ordered-Set |
|---|---|---|---|---|
| 0 | 0 | 00-FF | Normal Inter-Frame | /I/ |
| 0 | 1 | 00-0E | Reserved (Interpreted as Carrier Extend Error) | /V/ |
| 0 | 1 | 0F | Carrier Extend | /R/ |
| 0 | 1 | 10-1E | Reserved (Interpreted as Carrier Extend Error) | /V/ |
| 0 | 1 | 1F | Carrier Extend Error | /V/ |
| 0 | 1 | 20-FF | Reserved (Interpreted as Carrier Extend Error) | /V/ |
| 1 | 0 | 00-FF | Normal Data Transmission | /S/D/T/R/ |
| 1 | 1 | 00-FF | Transmit Error Propagation | /V/ |

The PCS sublayer 208 may also interpret the RX_DV, RX_ER, and RXD<7:0> signals and transmit ordered-sets based thereon. Table 2 shows the states of the RX_DV, RX_ER, and RXD<7:0> signals and corresponding transmitted ordered-sets.

TABLE 2

| RX_DV | RX_ER | RXD<7:0> | Indication | Ordered-Set |
|---|---|---|---|---|
| 0 | 0 | 00-FF | Normal Inter-Frame | /I/ |
| 0 | 1 | 00 | Normal Inter-Frame | /I/ |
| 0 | 1 | 01-1D | Reserved | — |
| 0 | 1 | 0E | False Carrier Indication | — |
| 0 | 1 | 0F | Carrier Extend | /R/ |
| 0 | 1 | 10-1E | Reserved | — |
| 0 | 1 | 1F | Carrier Extend Error | — |
| 0 | 1 | 20-FF | Reserved | — |
| 1 | 0 | 00-FF | Normal Data Reception | /S/D/T/R/ |
| 1 | 1 | 00-FF | Data Reception Error | /V/ |

Figure 15:
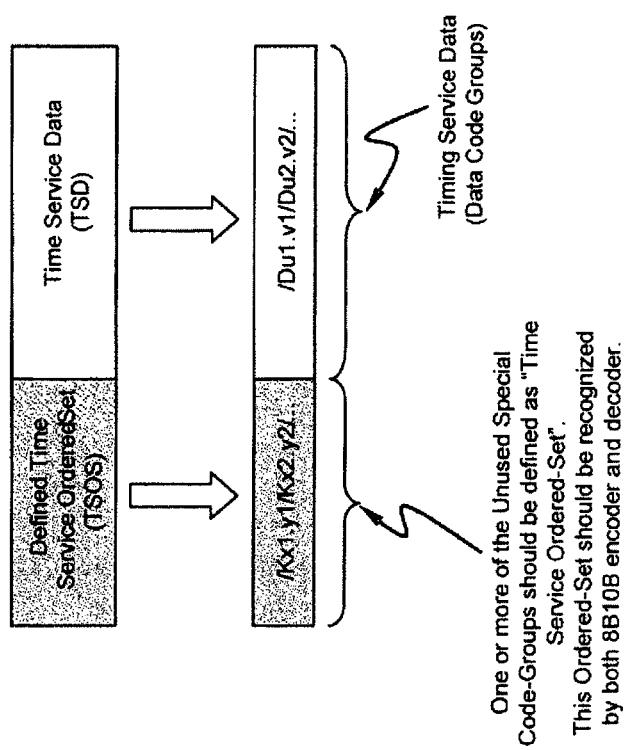
FIG. 15 shows Time Service Ordered-Set (TSOS) and Time Service Data encapsulation in accordance with an embodiment of the present disclosure.

As shown in FIG. 9, there are 5 unused special code-groups which may be used as Time Service Ordered-Sets (TSOSs) in accordance with an embodiment of the present disclosure. The set of five special code-groups may include /K28.0/, /K28.2/, /K28.3/, /K28.4/ and /K28.6/. The special code-group /K28.1/ may be excluded and not used because, as explained above, it contains a comma which desirably should be handled by the special code-group /K28.5/. The special code-group /K28.5/ containing a comma may be used for normal Gigabit Ethernet operations, while special code-group /K28.7/ may be reserved for diagnosis usage. Thus, referring to FIG. 15, a Time Service Ordered-Set (TSOS) may be defined according to one of three options in accordance with an embodiment of the present disclosure.

First, a Time Service Ordered-Set (TSOS) may be a single unused special code-group (K) selected from the unused special code-groups. For example, referring to FIG. 15, a Time Service Ordered-Set (TSOS) may be /Kx.y/.

Second, a Time Service Ordered-Set (TSOS) may be a sequence of code-groups comprising an initial unused special code-group (K) followed by additional unused special code-groups (K). For example, referring to FIG. 15, a Time Service Ordered-Set (TSOS) may be /Kx1.y1/Kx2.y2/.

Third, a Time Service Ordered-Set (TSOS) may be a sequence of code-groups comprising an initial unused special code-group (K) followed by additional data (D) code-groups. For example, referring to FIG. 15, a Time Service Ordered-Set (TSOS) may be /Kx.y/Du.v/. In this case, the second code-group /Du.v/ may be selected to provide a high bit transition density, proper disparity control, and sufficient coding distance similar to a choice of data characters in /C/ and /I/ ordered-sets.

A Time Service Ordered-Set (TSOS) should be universally understood by transmitters and receivers of Time Service Data (TSD). Standardization of Time Service Ordered-Sets (TSOSs) may facilitate interoperability between devices in a multi-vendor network.

Furthermore, the definition of a Time Service Ordered-Set (TSOS) should indicate a type of Time Service Data (TSD) encapsulated in a PCS frame. A globally unique Time Service Ordered-Set (TSOS) may be defined for each type of Time Service Data (TSD) (e.g., IEEE 1588 PTP TSD, NTP TSD, etc.). IEEE 1588 PTP and NTP are standard protocols used for transferring timing data in packet networks. Thus, to illustrate further, three time transfer protocols denoted TTP1, TTP2, and TTP3 may each have globally unique Time Service Ordered-Sets (TSOSs), TSOS1, TSOS2, and TSOS3, respectively. Each of these unique Time Service Ordered-Set (TSOS) may be defined based on any of the three options described above. In practice, most timing service applications may use available standard-based protocols like PTP and NTP, which means that the space of Time Service Ordered-Sets (TSOSs) available for use may be adequate (if not more than enough).

Figure 16:
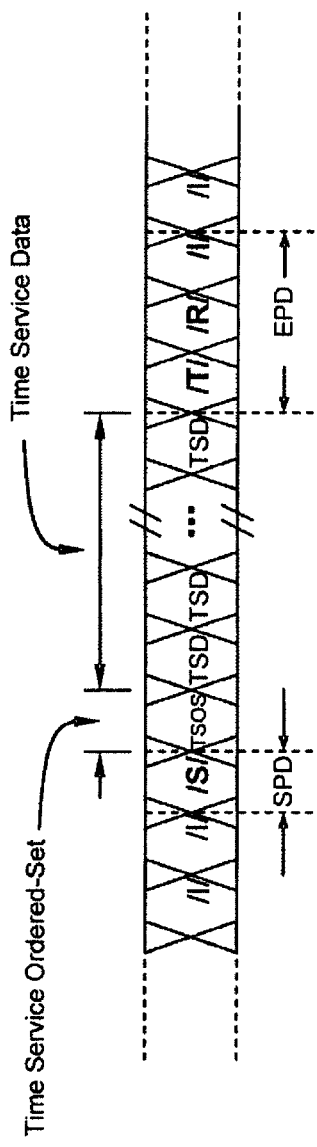
FIG. 16 shows an encapsulation of a Time Service Ordered-Set (TSOS) and Time Service Data (TSD) when an encoder is not busy in accordance with an embodiment of the present disclosure.

Referring to FIG. 16, there is shown an encapsulation of a Time Service Ordered-Set (TSOS) and Time Service Data (TSD) when an encoder is not busy in accordance with an embodiment of the present disclosure. The ordered-sets /S/ and /T/ may be used as delimiters to indicate a beginning and an end of each transmitted frame, respectively. A Time Service Ordered-Set (TSOS) may follow an /S/ ordered-set for any PCS frame carrying Time Service Data (TSD). FIG. 16 illustrates the encapsulation of Time Service Data (TSD) when an encoder is not busy (e.g., when no packet data from the GMII sublayer 210 is ready for transmission).

Figure 17:
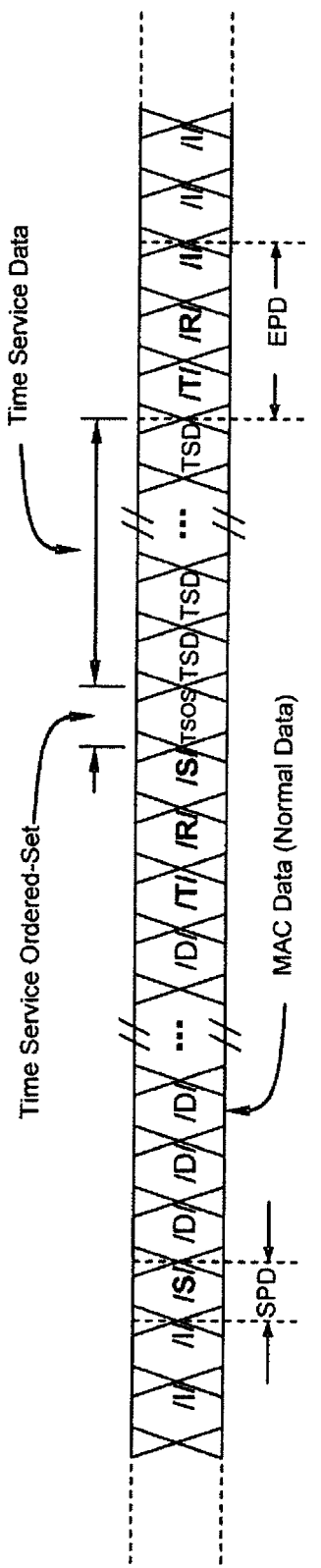
FIG. 17 shows an encapsulation of a Time Service Ordered-Set (TSOS) and Time Service Data (TSD) when an encoder is busy in accordance with an embodiment of the present disclosure.

Referring to FIG. 17, there is shown an encapsulation of a Time Service Ordered-Set (TSOS) and Time Service Data (TSD) when an encoder is busy in accordance with an embodiment of the present disclosure. The concept of frame bursting may be used when an encoder is busy transmitting MAC packets from the GMII sublayer 210. Frame bursting allows a device to send multiple PCS frames with a single access of a channel. The ordered-set /R/ may precede an /S/ ordered-set for second and subsequent packets within a burst of packets, as shown in FIG. 17. The transmission of a Time Service Ordered-Set (TSOS) and Time Service Data (TSD) may follow the PCS transmit data format described above. FIG. 17 illustrates the encapsulation of Time Service Data (TSD) when an encoder is busy (e.g., when packet data from the GMII sublayer 210 is ready for transmission).

At this point it should be noted that in either case (i.e., the case illustrated in FIG. 16 or the case illustrated in FIG. 17), the PCS transmit component 302, the PCS receive component 502, and the respective time transfer units 306 and 506 may capture write/read timestamps on-the-fly at the Physical Layer. This results in very accurate timestamp measurements and clock synchronization.

In view of the foregoing, it may be appreciated that Time Service Ordered-Sets (TSOSs) as defined herein may provide a vehicle for transporting timing information (either standards based or proprietary) directly over an Ethernet physical layer while bypassing higher protocol layer processing. Thus, impairments associated with these higher protocol layers that may impair the quality of a transferred clock are completely eliminated.

At this point it should be noted that time transfer via signal encoding in accordance with the present disclosure as described above typically involves the processing of input data and the generation of output data to some extent. This input data processing and output data generation may be implemented in hardware or software. For example, specific electronic components may be employed in a PCS sublayer or similar or related circuitry for implementing the functions associated with time transfer via signal encoding in accordance with the present disclosure as described above. Alternatively, one or more processors operating in accordance with instructions may implement the functions associated with time transfer via signal encoding in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of transferring time information, comprising:
   generating a time service ordered-set for inclusion in a physical coding sublayer frame of a physical layer device, the time service ordered-set comprising at least one special code-group selected from unused special code-groups and indicating a presence of time service data following the time service ordered-set in the physical coding sublayer frame;
   generating the time service data for inclusion in the physical coding sublayer frame; and
   transmitting the physical coding sublayer frame including the time service ordered-set followed by the time service data.

2. The method of claim 1, wherein the time service ordered-set consists of a single special code-group.

3. The method of claim 1, wherein the time service ordered-set comprises an initial special code group selected from unused special code-groups followed by at least one additional code-group.

4. The method of claim 3, wherein the at least one additional code-group is selected from unused special code-groups.

5. The method of claim 3, wherein the at least one additional code-group comprises a data code-group.

6. The method of claim 1, wherein the data code-group has at least one of high bit transition density, disparity control, and coding distance.

7. The method of claim 1, wherein generating the time service data comprises generating a transmit time stamp.

8. The method of claim 1, wherein the time service ordered-set indicates a type of the time service data.

9. The method of claim 1, further comprising:
   receiving the time service ordered-set in the physical coding sublayer frame; and
   extracting the time service data from the physical coding sublayer frame.

10. The method of claim 9, further comprising generating a receive time stamp to determine a receipt time of the time service data.

11. An apparatus for transferring time information, comprising:
    a time service data generator configured to generate time service data;
    an encoder configured:
      to generate a time service ordered-set for inclusion in a physical coding sublayer frame of a physical layer device, the time service ordered-set comprising at least one special code-group selected from unused special code-groups and indicating a presence of time service data following the time service ordered-set in the physical coding sublayer frame; and
      to include the time service data in the physical coding sublayer frame following the time service ordered-set; and
    a transmitter configured to transmit the physical coding sublayer frame including the time service ordered-set followed by the time service data.

12. The apparatus of claim 11, wherein the time service ordered-set consists of a single special code-group.

13. The apparatus of claim 11, wherein the time service ordered-set comprises an initial special code group selected from unused special code-groups followed by at least one additional code-group.

14. The apparatus of claim 13, wherein the at least one additional code-group is selected from unused special code-groups.

15. The apparatus of claim 13, wherein the at least one additional code-group comprises a data code-group.

16. The apparatus of claim 15, wherein the data code-group has at least one of high bit transition density, disparity control, and coding distance.

17. The apparatus of claim 11, wherein the time service data generator is configured to generate a transmit time stamp.

18. The apparatus of claim 11, wherein the time service ordered-set indicates a type of the time service data.

19. An apparatus for transferring timing information, comprising:
    a receiver configured to receive a time service ordered-set in a physical coding sublayer frame of a physical layer device, the time service ordered-set comprising at least one special code-group selected from unused special code-groups and indicating a presence of time service data following the time service ordered-set in the physical coding sublayer frame;
    a decoder configured to extract the time service data from the physical coding sublayer frame.

20. The apparatus of claim 19, further comprising a time service data generator configured to generate a receive time stamp to determine a receipt time of the time service data.

21. A method of transferring time information using an encoder that encodes n bit bytes into m bit code words, m being greater than n, the method comprising:
    generating a time service data indicator for inclusion in a physical coding sublayer frame of a physical layer device, the time service data indicator comprising at least one m bit code word and indicating a presence of time service data following the time service data indicator in the physical coding sublayer frame;
    generating the time service data for inclusion in the physical coding sublayer frame; and
    transmitting the physical coding sublayer frame including the time service data indicator followed by the time service data.

22. The method of claim 21, further comprising:
    receiving the time service data indicator in the physical coding sublayer frame; and
    extracting the time service data from the physical coding sublayer frame.

23. An apparatus for transferring time information, comprising:
    a time service data generator configured to generate time service data;
    an encoder configured to encode n bit bytes into m bit code words, m being greater than n, the encoder being further configured:
      to generate a time service data indicator for inclusion in a physical coding sublayer frame of a physical layer device, the time service data indicator comprising at least one m bit code word and indicating a presence of the time service data following the time service data indicator in the physical coding sublayer frame; and to include the time service data in the physical coding sublayer frame following the time service data indicator; and a transmitter configured to transmit the physical coding sublayer frame including the time service data indicator followed by the time service data.

24. An apparatus for transferring timing information, comprising:

a receiver configured to receive a physical coding sublayer frame; and a decoder configured to decode m bit code words into n bit bytes, m being greater than n, the decoder being further configured:

to detect a time service data indicator in the received physical coding sublayer frame, the time service data indicator comprising at least one m bit code word and indicating a presence of time service data following the time service data indicator in the physical coding sublayer frame; and to extract the time service data from the received physical coding sublayer frame.

* * * * *